(12) United States Patent
Gauthier et al.

(10) Patent No.: US 11,307,898 B2
(45) Date of Patent: Apr. 19, 2022

(54) SERVER RESOURCE BALANCING USING A DYNAMIC-SHARING STRATEGY

(71) Applicant: SAP SE, Walldorf (DE)

(72) Inventors: Alain Gauthier, Montreal (CA); Martin Parent, St. Joseph du Lac (CA); Edgar Lott, Nussloch (DE)

(73) Assignee: SAP SE, Walldorf (DE)

( * ) Notice: Subject to any disclaimer, the term of this patent is extended or adjusted under 35 U.S.C. 154(b) by 440 days.

(21) Appl. No.: 16/286,051

(22) Filed: Feb. 26, 2019

(65) Prior Publication Data

US 2020/0272522 A1 Aug. 27, 2020

(51) Int. Cl.
*G06F 9/50* (2006.01)

(52) U.S. Cl.
CPC ............ *G06F 9/5038* (2013.01); *G06F 9/505* (2013.01); *G06F 9/5072* (2013.01); *G06F 9/5083* (2013.01)

(58) Field of Classification Search
CPC ...... G06F 9/5038; G06F 9/5083; G06F 9/505; G06F 9/5072; G06F 9/5066; G06F 2209/504; G06F 2209/5018; Y02D 10/00
See application file for complete search history.

(56) References Cited

U.S. PATENT DOCUMENTS

| | | |
|---|---|---|
| 5,881,238 A | 3/1999 | Aman et al. |
| 5,982,780 A | 11/1999 | Bohm et al. |
| 6,128,657 A | 10/2000 | Okanoya et al. |
| 6,148,324 A | 11/2000 | Ransom et al. |
| 7,321,926 B1 | 1/2008 | Zhang et al. |
| 7,325,233 B2 | 1/2008 | Kuck et al. |
| 7,415,704 B2 | 8/2008 | Schmidt et al. |
| 7,587,721 B2 | 9/2009 | Schmidt et al. |
| 7,707,583 B2 | 4/2010 | Schmidt et al. |
| 8,051,152 B2 | 11/2011 | Rehm et al. |

(Continued)

OTHER PUBLICATIONS

Chandramouli et al., "Query suspend and resume." Proceedings of the 2007 ACM SIGMOD international conference on Management of data. 2007, 557-568, 12 pages.

(Continued)

*Primary Examiner* — Lewis A Bullock, Jr.
*Assistant Examiner* — Kevin X Lu
(74) *Attorney, Agent, or Firm* — Fish & Richardson P.C.

(57) ABSTRACT

The present disclosure involves systems, software, and computer implemented methods for resource allocation and management. One example method includes receiving a request, including a first application priority, to run a task for an application. At least one second application priority is identified. A maximum number of parallel tasks per application priority is determined. Application priority weights are assigned to the first application priority and the second application priorities. Application priority divisors are determined, for the first application priority and the second application priorities, based on a respective application priority weight and a number of currently running applications of a respective application priority. A number of parallel tasks for the first application and other applications are determined based on the maximum number of allowable parallel tasks per application, an overall divisor, and a respective application priority weight. A number of parallel tasks are assigned to the first application.

20 Claims, 18 Drawing Sheets

(56) References Cited

U.S. PATENT DOCUMENTS

| | | |
|---|---|---|
| 8,387,056 B2 | 2/2013 | Loucks |
| 8,706,783 B2 | 4/2014 | Gauthier et al. |
| 8,732,714 B2 | 5/2014 | Vaidya et al. |
| 8,826,308 B1 | 9/2014 | Jolfaei et al. |
| 8,972,883 B2 | 3/2015 | Abdukalykov et al. |
| 9,396,088 B2 | 7/2016 | Liang et al. |
| 9,854,052 B2 | 12/2017 | Abdukalykov et al. |
| 11,042,402 B2 | 6/2021 | Gauthier et al. |
| 2005/0262507 A1 | 11/2005 | Langen et al. |
| 2006/0236368 A1 | 10/2006 | Raja et al. |
| 2010/0037230 A1 | 2/2010 | Potonniee et al. |
| 2010/0153524 A1 | 6/2010 | Rehm et al. |
| 2010/0161397 A1 | 6/2010 | Gauthier et al. |
| 2012/0011515 A1 | 1/2012 | Jolfaei et al. |
| 2012/0166398 A1 | 6/2012 | Gauweiler |
| 2013/0036425 A1 | 2/2013 | Zimmermann |
| 2013/0311686 A1 | 11/2013 | Fetterman et al. |
| 2014/0028702 A1 | 1/2014 | Liang et al. |
| 2014/0028728 A1 | 1/2014 | Liang et al. |
| 2014/0028729 A1 | 1/2014 | Abdukalykov et al. |
| 2014/0028730 A1 | 1/2014 | Abdukalykov et al. |
| 2014/0033104 A1 | 1/2014 | Lavoie et al. |
| 2014/0033109 A1 | 1/2014 | Ghorayeb et al. |
| 2014/0059455 A1 | 2/2014 | Abdukalykov et al. |
| 2014/0059488 A1 | 2/2014 | El-Jayousi et al. |
| 2014/0067548 A1 | 3/2014 | Liang et al. |
| 2014/0068485 A1 | 3/2014 | El-Jayousi et al. |
| 2014/0068623 A1 | 3/2014 | Kanemasa et al. |
| 2014/0075350 A1 | 3/2014 | Gauthier et al. |
| 2014/0075390 A1 | 3/2014 | Gauthier et al. |
| 2014/0104158 A1 | 4/2014 | Abdukalykov et al. |
| 2014/0149913 A1 | 5/2014 | Gautlier et al. |
| 2014/0157099 A1 | 6/2014 | Abdukalykov et al. |
| 2014/0359182 A1* | 12/2014 | Georgiev .................. G06F 9/52 710/241 |
| 2014/0359632 A1 | 12/2014 | Kishan et al. |
| 2015/0120809 A1 | 4/2015 | Braemer |
| 2015/0339158 A1 | 11/2015 | Harris et al. |
| 2017/0220389 A1* | 8/2017 | Michael .................. H04L 67/10 |
| 2017/0272349 A1 | 9/2017 | Hopkins et al. |
| 2017/0278041 A1 | 9/2017 | LaReau et al. |
| 2017/0286167 A1 | 10/2017 | Zhu |
| 2018/0025301 A1 | 1/2018 | Paul et al. |
| 2018/0060400 A1 | 3/2018 | Wu et al. |
| 2018/0203728 A1 | 7/2018 | Yan et al. |
| 2018/0343164 A1 | 11/2018 | Wylie et al. |
| 2019/0155644 A1 | 5/2019 | Aronovich |
| 2020/0174844 A1 | 6/2020 | Bergsma et al. |
| 2020/0272507 A1 | 8/2020 | Gauthier et al. |
| 2020/0272510 A1 | 8/2020 | Gauthier et al. |
| 2020/0272511 A1 | 8/2020 | Gauthier et al. |
| 2020/0272523 A1 | 8/2020 | Gauthier et al. |

OTHER PUBLICATIONS

Kosta et al., "Thinkair: Dynamic resource allocation and parallel execution in the cloud for mobile code offloading." 2012 Proceedings IEEE Infocom. IEEE, 2012, 945-953, 9 pages.

Panayiotou et al., "On-line predictive techniques for differentiated services networks." Proceedings of the 40th IEEE Conference on Decision and Control (Cat. No. 01CH37228). vol. 5. IEEE, 2001, 4529-4534, 6 pages.

Gouda et al., "Priority based resource allocation model for cloud computing." International Journal of Science, Engineering and Technology Research (IJSETR) 2.1, Jan. 2013, 5 pages.

Huang et al., "A priority-based resource allocation strategy in distributed computing networks." Journal of Systems and Software 58.3, Apr. 13, 2001, 13 pages.

Non-Final Office Action issued in U.S. Appl. No. 16/286,073 dated Jul. 17, 2020, 22 pages.

Non-Final Office Action issued in U.S. Appl. No. 16/286,148 dated Jul. 10, 2020, 16 pages.

Pawar et al., "Priority based dynamic resource allocation in cloud computing." 2012 International Symposium on Cloud and Services Computing, IEEE, Dec. 17, 2012, 6 pages.

Shaw et al., "A Survey on Scheduling and Load Balancing Techniques in Cloud Computing Environment", 2014 International conference on computer and communication technology (ICCCT), Sep. 2014, 87-95, 9 pages.

Non-Final Office Action issued in U.S. Appl. No. 16/286,084 dated Dec. 4, 2020, 26 pages.

Extended European Search Report issued in European Application No. 20155353.4 dated Jun. 30, 2020, 10 pages.

U.S. Appl. No. 16/286,051, filed Feb. 26, 2019, Gauthier et al.
U.S. Appl. No. 16/286,073, filed Feb. 26, 2019, Gauthier et al.
U.S. Appl. No. 16/286,084, filed Feb. 26, 2019, Gauthier et al.
U.S. Appl. No. 16/286,148, filed Feb. 26, 2019, Gauthier et al.
U.S. Appl. No. 16/286,163, filed Feb. 26, 2019, Gauthier et al.
Final Office Action issued in U.S. Appl. No. 16/286,073 dated Feb. 23, 2020, 33 pages.

* cited by examiner

| Application Scenario 202 | Priority 204 |
|---|---|
| Segmentation of User on UI 230 | 0 232 |
| Campaign Setup UI 231 | 0 233 |
| Campaign Execution High 208 | 1 214 |
| Interaction Load 218 | 1 220 |
| Campaign Execution Medium 210 | 2 216 |
| Contact Load 224 | 2 222 |
| Product Load Upload | 2 |
| Campaign Success Data Materialization | 2 |
| Score Persistency | 3 |
| Product Recommendation Generation 226 | 3 228 |
| Offer Recommendation Generation | 3 |
| ... | ... |

200

| Scenario Priority | Resource Sharing % |
|---|---|
| 0 | 80% |
| 1 | 45% |
| 2 | 30% |
| 3 | 20% |
| 4 | 5% |

250

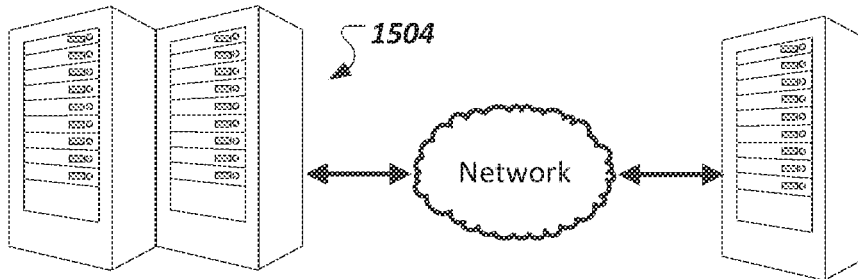

FIG. 15

| Number | Task | Server | |
|---|---|---|---|
| 1 | <task 1> | <server 1> | |
| 2 | <task 2> | <server 2> | 1506 |
| 3 | <task 3> | <server 2> | |
| 4 | <available> | <server 1> | |
| 5 | <task 4> | <server 2> | |
| 6 | <available> | <server 2> | |

| Number | Task | Server | |
|---|---|---|---|
| 1 | <task 1> | <server 1> | |
| 2 | <task 2> | <server 2> | |
| 3 | <task 3> | <server 2> | 1508 |
| 4 | <task 5> | <server 1> | |
| 5 | <task 4> | <server 2> | |
| 6 | <available> | <server 2> | |

| Number | Task | Server | |
|---|---|---|---|
| 1 | <task 1> | <server 1> | |
| 2 | <task 2> | <server 2> | |
| 3 | <task 3> | <server 2> | 1510 |
| 4 | <task 5> | <server 1> | |
| 5 | <task 4> | <server 2> | |
| 6 | <task 6> | <server 2> | |

| Number | Task | Server | |
|---|---|---|---|
| 1 | <task 1> | <server 1> | |
| 2 | <task 2> | <server 2> | |
| 3 | <task 3> | <server 2> | 1512 |
| 4 | <task 5> | <server 1> | |
| 5 | <task 4> | <server 2> | |
| 6 | <available> | <server 2> | |

| PRIORITY | | | | MEMORY (MB) | | | | | RFC | | | |
|---|---|---|---|---|---|---|---|---|---|---|---|---|
| Kernel | App | Process type | User | Process Heap Used | Hyper Size Session | ABAP VM usage | Ext. Segments usage | Jobs | running | pending | max used | Time spend |
| High | 1 | Dialog | DDIC | undefined | 5544B | 46431 | 12431 | INTERACTIONS_POST_JOB1 | 1(Q0) | 2 of 2 | 1 | |
| High | 1 | Dialog | DDIC | undefined | 5544B | 53234 | 12431 | INTERACTIONS_POST_JOB2 | 2(Q0) | 2 of 2 | 2 | |
| High | 1 | Dialog | DDIC | undefined | 5544B | 53231 | 12431 | INTERACTIONS_POST_JOB3 | 2(Q0) | 2 of 2 | 2 | |
| High | 2 | Dialog | DDIC | undefined | 5544B | 53517 | 12431 | CONTACTS_POST_JOB1 | 7(Q0) | 10 of 10 | 7 | |
| High | 2 | Dialog | DDIC | undefined | 5544B | 57541 | 12431 | CONTACTS_POST_JOB2 | 5(Q0) | 10 of 10 | 8 | |
| High | 2 | Dialog | DDIC | undefined | 5544B | 56840 | 12431 | CONTACTS_POST_JOB3 | 8(Q0) | 10 of 10 | 8 | |
| High | 1 | Dialog | DDIC | undefined | 5544B | 52402 | 12431 | INTERACTIONS_POST_JOB4 | 2(Q0) | 2 of 2 | 2 | |
| High | 1 | Dialog | DDIC | undefined | 5544B | 51290 | 12431 | INTERACTIONS_POST_JOB5 | 1(Q0) | 1 of 2 | 2 | |
| High | 2 | Dialog | DDIC | undefined | 5544B | 62251 | 12431 | CONTACTS_POST_JOB4 | 5(Q0) | 5 of 10 | 10 | |
| High | 2 | Dialog | DDIC | undefined | 5544B | 64820 | 12431 | CONTACTS_POST_JOB5 | 0(Q0) | 0 of 10 | 10 | |
| High | 1 | Dialog | GAUTHIERA | undefined | 5544B | 643076 | 168467 | HARO_SEND_EMAIL_JOB1 | 24(Q0) | 424 of 858 | 48 | 22 sec |

FIG. 16B

SERVER RESOURCE BALANCING USING A DYNAMIC-SHARING STRATEGY

CROSS-REFERENCE TO RELATED APPLICATIONS

This application is a co-pending application of, and filed in conjunction with, U.S. patent application Ser. No. 16/286,084, filed on Feb. 26, 2019, entitled "INTELLIGENT SERVER TASK BALANCING BASED ON SERVER CAPACITY", and patent application Ser. No.: 16/286,073, filed on Feb. 26, 2019, entitled "SERVER RESOURCE BALANCING USING A FIXED-SHARING STRATEGY", and patent application Ser. No.: 16/286,148, filed on Feb. 26, 2019, entitled "SERVER RESOURCE BALANCING USING A SUSPEND-RESUME STRATEGY", and patent application Ser. No.: 16/286,163, filed on Feb. 26, 2019, entitled "SERVER RESOURCE ORCHESTRATION BASED ON APPLICATION PRIORITY"; the entire contents of each which are incorporated herein by reference.

TECHNICAL FIELD

The present disclosure relates to computer-implemented methods, software, and systems for resource allocation and management.

BACKGROUND

An application server environment can include various layers. For instance, an application server environment can have a presentation layer that enables development of user interfaces. The user interfaces can present information that is generated by an application logic layer. The application logic layer can include logic related to creation, modification, and deletion of objects that are specific to a particular application domain. A persistence layer can store object information, and can support database independence and scalability. Application logic can be developed independent of a particular database or operating system. Other layers can include integration and connectivity layers.

SUMMARY

The present disclosure involves systems, software, and computer implemented methods for resource allocation and management. One example method includes: receiving, in a dispatching layer, a request to run a first task for a first application, the request including a first application priority; identifying at least one second application priority of at least one currently running application, wherein the at least one second application priority is different than the first application priority; determining a maximum number of allowable parallel tasks per application priority; assigning application priority weights to each of the first application priority and the at least one second application priority; determining, for each of the first application priority and the at least one second application priority, an application priority divisor based on a respective application priority weight and a number of currently running applications of a respective application priority; determining an overall divisor based on the respective determined application priority divisors; determining a number of parallel tasks for the first application and the at least one currently running application based on the maximum number of allowable parallel tasks per application, the overall divisor, and a respective application priority weight, wherein determining includes assigning a first number of parallel tasks to the first application; and executing the first application using the assigned first number of parallel tasks.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 15 is a block diagram illustrating an example system for resource allocation and management based on server capacity.

FIGS. 16A and 16B illustrate an example monitoring user interface.

DETAILED DESCRIPTION

Figure 1:
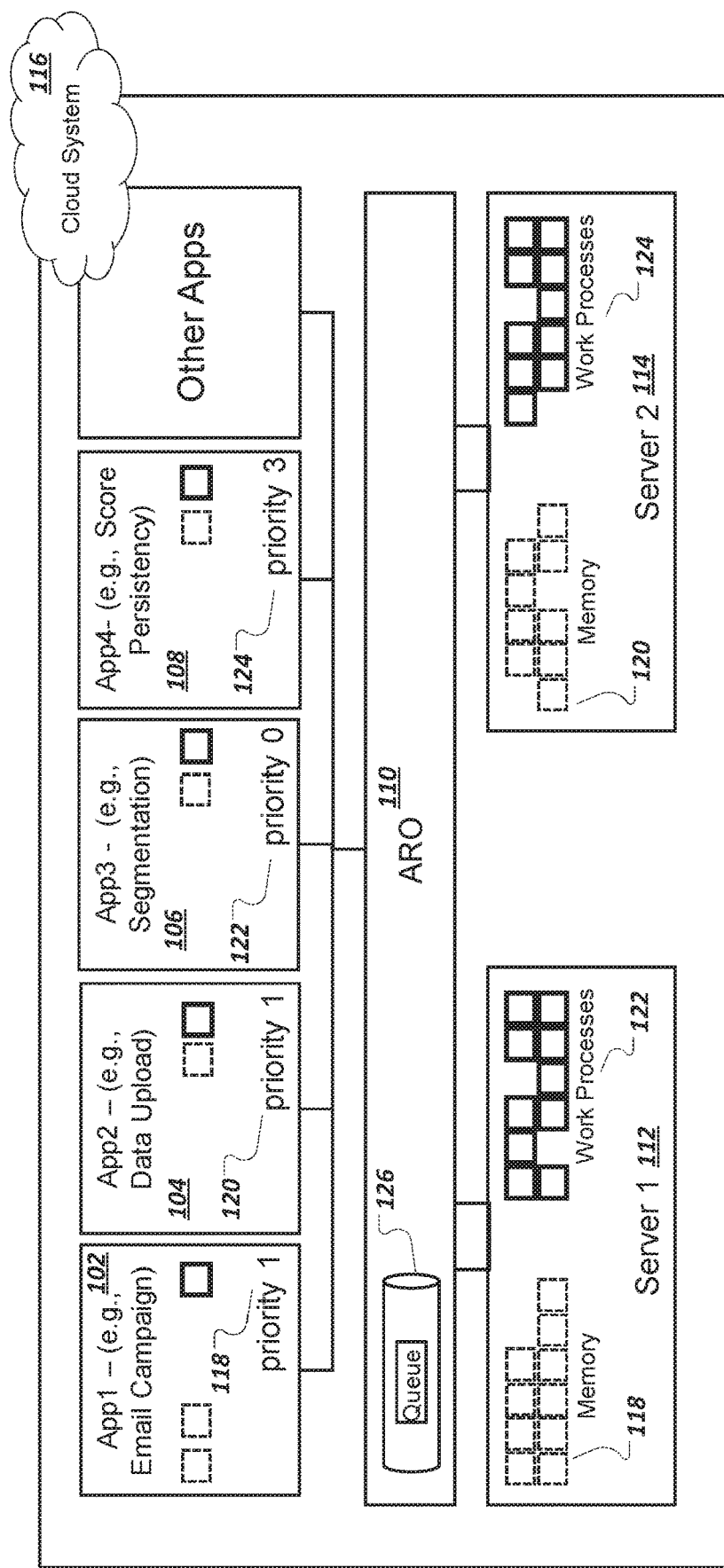
FIG. 1 is a block diagram illustrating an example system for resource allocation and management.

A customer of a cloud system can have multiple applications running concurrently in the cloud system. A customer can be sized, based on application load needs, including the allocation of resources selected to meet those needs, with the customer being charged accordingly, for allocated resources. For instance, an example customer may be a customer of a marketing system, (for instance, as an example cloud system). The customer may desire to run a certain number and certain size(s) of promotion campaigns, may desire to set up a certain number of accounts, etc. A fixed number or amount of resources, such as processors, servers, memory, and a maximum number of concurrent work processes can be set up for the customer. Work processes can be a server resource that are allocated to run tasks of customer applications.

Assigning resources and charging customers for the allocated resources can enable customers to be charged according to proportional use of resources. However, customers may have peak usage times, where an amount of resources that is larger than their customary allocated amount is needed, specifically during those peak times. Peak times can occur when a customer has a need to run multiple, concurrent applications, for example.

For instance, in the marketing system example, some marketing applications may be, at times, resource-intensive. For instance, a campaign execution application may be configured to send out one million campaign email messages, with each message being customized before being sent, e.g., with product recommendations. In some instances, product recommendations may be cached recommendations that have been previously generated by a product recommendation application. The product recommendation application may need to run periodically, and may need to run in parallel with the campaign execution application if a particular campaign execution, such as the one million email sending, takes a considerable amount of time to complete. For instance, the campaign execution application may take more than one hour to complete and it may be desired to run the product recommendation application at least once per hour, to enable product recommendations to be current. In addition, the marketing system can provide customer-facing applications, e.g., for marketing account representatives, for configuring campaigns, etc. The customer-facing applications should be interactive, even if multiple, concurrent background tasks are running.

Without application and resource orchestration, different sorts of issues may arise. For instance, the system may experience issues such as resource shortage, lack of responsiveness, potential server crashes, etc., at peak times. A customer can buy or be allocated more hardware to handle peak loads, but such an approach is generally not efficient, as a significant amount of resources may go unused during non-peak times just to have ample resources available for peak processing times. A customer generally would not want to pay to have allocated resources that are often not being used. Similarly, a system operator generally would not want to provide resources without a commensurate cost for the amount of resources allocated. Accordingly, a system operator may desire to improve resource orchestration for customers, to best use an assigned, fixed amount of resources.

As another example a customer may desire that one application or type of application be given a higher priority than another application for concurrently executing applications. A traditional system may assign a different process priority to online versus batch programs, but may, when dispatching resources, not differentiate between different background processes for different applications, even if one application is more important to the customer than another. Accordingly, some priority applications may run slower than necessary because they are sharing equally available server resources instead of running in a context where processes for more important applications are getting more resources for faster execution as compared to processes for less important applications. Traditional kernels do not have an application priority concept that could influence the way a server is allocating resources (e.g., threads, memory, processors) among concurrent running applications. Existing operating system load balancers are application-agnostic and thus unaware of application priority. Such a limitation can result in less than optimal use of resources from a customer and application-level perspective. To solve this limitation, a centralized layer can orchestrate resources based on application-level priority.

Without centralized orchestration, each application may use different mechanisms to individually attempt to manage available resources for parallelization, which can be problematic, since applications may not dynamically adapt to incoming loads during their execution. For instance, each application can individually attempt to precalculate how many resources to request for execution of application tasks. The application can query a server system for a number of available processors, amount of available memory, and/or a number of available work processes, perform calculation(s) to determine desired resources, and request the determined amounts of resources. For instance, an application can request resources for threads based on a current state (e.g., number of available work processes) of the server and on an estimated application load, in a preparation phase before starting application work tasks.

Each application may estimate how many of available work processes or other resources to request, for example. For instance, an application may query a number of available work processes, receive a reply indicating the number of available work processes (e.g., ten), and determine to request a certain number or percentage of the available work processes (e.g., eight), thereby leaving the remaining number (e.g., two) available for other processes. However, a given application does not have a system-wide knowledge or knowledge of the future to know when and which other applications may request resources. For instance, a second application may, after a first application has taken eight out of ten work processes, subsequently desire to obtain or submit a request for six work processes for its operations, which results in having that request unfulfilled due to only two remaining work processes being available. Accordingly, precalculations done by the first application may quickly become invalid since system-wide state can be unpredictable. If each application separately manages available resources for parallelization, resources may not be optimally balanced since no single application has a global view of system-wide resource allocation.

Alternatively, and as described herein, a centralized orchestration layer can be used as an entity that is more responsive, more dynamic, and more aware about system-wide resources and overall system state, allowing the system to place responsibilities for resource orchestration in a centralized component rather than having scattered, inconsistent, and inefficient approaches in multiple applications. The centralized orchestration component can remove a need for applications to be responsible for resource determination and allocation.

The orchestration component can create a clear separation between an application layer and a dispatching layer. Applications no longer need to be concerned with determining which server will perform a requested task or how many resources should be reserved by the application. Applications no longer need to attempt to determine on their own how many resources, such as threads, task parallelizing, etc., to configure or allocate, or how many or which servers to request for processing. A centralized dispatcher, on the other hand, can have a system-wide awareness and can dispatch resources efficiently.

The dispatcher can perform dispatching in a manner that is transparent to applications. An application can send an execution request, and then wait for a response to the execution request. The application need not be aware whether there are available resources at the time of the request, whether the application is a highest priority application, what other application priorities exist, what other applications are running, server status and availability, etc. As described in more detail below, an application's responsibility can be focused on dividing up application processing into multiple portions so that the centralized component can efficiently dispatch those portions (and portions from other applications) as resources become available.

The orchestration component can be responsible for balancing available work processes among concurrent applications in a controlled way to keep the system responsive and lean, to prevent system downtime, and therefore increase customer satisfaction and experience. The centralized component can monitor system resources (e.g., work processes, memory, processors), across servers, and balance, distribute and orchestrate application execution based on the monitored resources. The central component can efficiently manage existing resources rather than simply adding more hardware.

More specifically, a centralized application resources orchestration (ARO) layer can, in a controlled way, orchestrate and balance server resources based on application-level priority. The ARO layer can be integrated within each application to achieve better balancing of concurrent application asynchronous remote calls (as compared to non-use of a central ARO layer). Use of the ARO layer can result in improved system responsiveness, fewer customer escalations, reduced memory and other resource bottlenecks, and improved application performance. Each application can be granted an appropriate amount of resources based on the application priority level, with higher priority applications achieving higher performance and responsiveness.

With centralized orchestration, even if a particular application with asynchronous calls is running for a very long time, if a higher priority business process that requires system resources is initiated, resources can be obtained and provided to the higher priority application. Higher business processes can receive more resources while ongoing business processes with a lesser priority can be slowed down by reducing the number of resources they can access. For instance, a product recommendation task may be currently being executed, and a time-sensitive email campaign may be initiated, that has a higher priority. The product recommendation task may be lower priority, since existing product recommendations may be used (rather than an updated recommendation) if a current execution of the product recommendation task has not yet finished when a particular marketing customer's data is accessed. A campaign administration tool, with an interactive user interface, may be of a higher priority than both the email campaign and the product recommendation applications, due to a desire to have the user interface be responsive.

In some instances, application priorities can be represented by a numeric value, with lower values meaning higher priority than higher values. For instance, the campaign administration user interface, the email campaign, and the product recommendation applications can have configured priorities of 1, 2, and 3, respectively. The orchestration component can load balance resources based on priorities of running applications (e.g., such as when the campaign administration, email campaign, and product recommendation applications are running concurrently). The orchestration component can analyze priorities of current processes, and allocate resources to or pause processes, based on the application priorities, to generally give more resources to higher priority processes.

The orchestration layer can include a system level resource dispatcher that can be integrated into applications. A systems provider that provides a full stack solution, including application and load balancing, can be advantageous, due to ease of integration of the dispatcher into applications. Each application can integrate with the orchestration layer, by creating an instance of a dispatcher, providing a single input of application priority, to enable system-wide dispatching of resources based on application priority to proportionally allocate resources to concurrently running applications. Accordingly, resources can be controlled and balanced, which can avoid server(s) from being overloaded by lower priority processes.

Different types of algorithms can be plugged in and used to dispatch resources. For instance, a suspend-resume strategy can be employed in which lower priority applications are suspended until other applications with higher priorities have finished. As another example, different types of sharing strategies can be used, where all applications run in parallel, but parallelization and resource usage is reduced for applications with lower priority. Fixed sharing and dynamic sharing approaches can be used, as described below. Algorithms and the dispatcher can be application-type agnostic, in that resource orchestration based on application priority can be performed for any type of application.

FIG. 1 is a block diagram illustrating an example system 100 for resource allocation and management. Applications 102, 104, 106, and 108 access an ARO (Application Resource Orchestration) layer 110 to have application tasks dispatched to a particular server, such as a first server 112 or a second server 114, in a cloud system 116. Each of the applications 102, 104, 106, and 108 have an associated application priority. For instance, the applications 102, 104, 106, and 108 respectively have a priorities of one 118, one 120, zero 122, and three 124.

Application priorities can be represented as a numeric value (e.g., non-negative integer), with lower numeric values representing higher priorities. For instance, application priority of zero (e.g., the priority 122) can be a highest priority, priority one (e.g., the priorities 118 and 120) the next highest, and so on. Other priority representations can be used.

Figure 2A:
FIG. 2A illustrates an example table illustrating example application scenario priorities.

FIG. 2A illustrates an example table 200 illustrating example application scenario priorities. In some implementations, rather than an application priority, an application scenario priority 202 is used for various application scenarios 204, where an application scenario represents a particular use case for an application. Different use cases for a same application may have different priorities. For instance, a campaign execution may have multiple scenarios and each scenario may have a different scenario priority.

For instance, a high-priority campaign execution scenario 208, and a medium-priority campaign execution scenario 210 have priorities of one 212 and two 216, respectively, for a campaign execution application. As another example, a data load scenario 218 for interaction data has a higher priority 220 of one than a priority of two 222 for a data load scenario 224 for contact data. A product recommendation application scenario 226 has a lower application priority of three 228. A user segmentation user interface scenario 230 and a campaign setup user interface scenario 231 each have highest priorities 232 and 233 of zero, respectively (e.g., the system can be configured to ensure that the user interface is responsive). As presented herein, "application priority" may refer to a priority of a particular application and/or a priority of a particular scenario for that application, with "application priority" generally being used.

An application priority can be determined or obtained in various ways, by an application. For instance, application priorities can be predetermined and stored in a configuration table. In some implementations, customers can access and edit the application priorities. A systems provider may provide default application priorities, in the configuration table, for various applications (and/or application scenarios). As described below, an application can pass an application priority to a dispatcher instance. If the priority is stored in a configuration table, the application can be configured to retrieve the priority from the configuration table and pass the retrieved priority to the dispatcher instance.

An application scenario priority can also be determined by an application at run time. For example, an application may programmatically determine that a particular execution of an application scenario should have a higher priority than normal. As another example, the application can receive information from a user interface (e.g., as entered by an administrator) that indicates that an application scenario should have a particular priority. The application can pass the determined priority value to the dispatcher instance.

Having an application provide the application priority to the dispatcher means the dispatcher does not need to be configured to determine which applications should have which priorities. The dispatcher can orchestrate resources based on priority, without being concerned with storing or determining priorities.

Figure 2B:
FIG. 2B illustrates example resource sharing percentages for various example application scenario priorities.

As one example, the dispatcher can allocate resources according resource sharing percentage assigned for each priority, as shown in a table 250 in FIG. 2B. Resource sharing percentages of 80%, 45%, 30%, 20%, and 5% have been assigned to application priorities 0, 1, 2, 3, and 4, respectively. Other resource sharing and dispatching algorithms can be used, as described below.

Referring again to FIG. 1, the applications 102, 104, 106, and 108 can each integrate with the ARO layer 110 so that the ARO layer 110 can balance asynchronous RFCs (Remote Function Calls) calls based on available system resources (e.g., memory 118 and 120, and work processes 122 and 124) and application priority. The ARO layer can ensure that asynchronous work processes triggered from the applications 102, 104, 106, or 108 are intelligently dispatched to the server 112 or the server 114, based on system load and on pending processes in a queue 126.

Applications 102, 104, 106, or 108 can determine when to run a particular application scenario, and at that time can interface with an ARO dispatcher instance provided by the ARO layer 110. The applications can use the ARO dispatcher instance to trigger asynchronous RFC calls which can result in assignment to work processes on a particular server 112 or 114 based on current server workload and application priorities.

Figure 3:
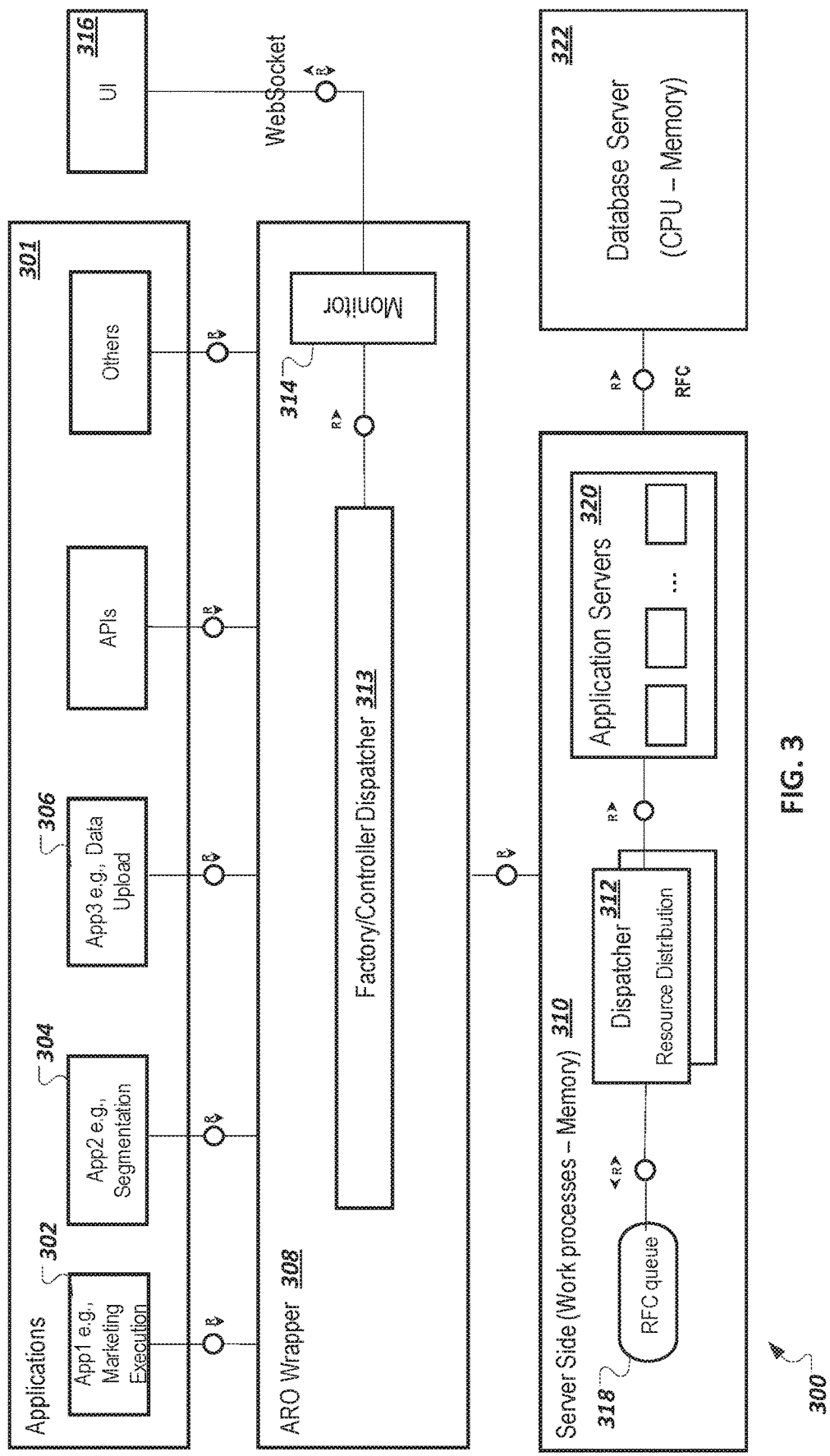
FIG. 3 is a block diagram illustrating an example system for resource allocation and management.

FIG. 3 is a block diagram illustrating an example system 300 for resource allocation and management. Example applications reside in an application layer 301, including a marketing execution application 302, a marketing segmentation application 304, and a data upload application 306. Each application 302, 304, and 306 can have an application priority.

In some implementations, an ARO layer is an ARO wrapper 308 that encapsulates dispatcher objects in a server layer 310, including a server-side dispatcher 312. In some implementations, the server-side dispatcher 312 is a modified version of a dispatcher that was previously configured to perform dispatching for internal processes. The modified version of the dispatcher can perform dispatching for applications, in the application layer 301, based on application priority.

In some implementations, applications can interface directly with the dispatcher 312, but, as an alternative, interfacing with the ARO wrapper 308 can provide certain advantages. The ARO wrapper 308 can be used to create common shareable services and a simplified interface to the server-side dispatcher 312. The server-side dispatcher 312 can include functionality and interfaces that may not be applicable to applications in the application layer 301 (e.g., some server-side dispatcher interfaces and functions may be specific for dispatching done internally on the server 310). The ARO wrapper 308 can present an interface that includes just functionality applicable for application-layer 301 application interfacing with the server-side dispatcher 312. The ARO wrapper 308 can provide an encapsulated interface that can simplify instantiation and use of the server-side dispatcher 312, for applications. The ARO wrapper 308 can be a proxy for the dispatcher in the server 310 environment. The ARO wrapper 308 can be a single point of reference for applications to use for running tasks that can be parallelized by the system.

A constructor for the ARO wrapper 308 can be a simplified version of a constructor for the server-side dispatcher 312, with fewer input parameters, for example. An application or application scenario priority input can be an input parameter for the ARO wrapper 308, for example, and the ARO wrapper 308 can pass the application/application scenario input to the server-side dispatcher 312. A factory or controller dispatcher 313 can create ARO wrapper and/or dispatcher 312 instances. In general, the ARO wrapper 308 can forward requests, with stated application priority, to the dispatcher 312, and forward response notification to requesting applications.

The ARO wrapper 308 can be introduced to provide features that may not be available in the server-side dispatcher 312, for example. For instance, an additional feature can be a monitoring feature. For instance, a monitor 314 can be configured to provide a realtime visualization user interface 316 that visualizes how resources are being orchestrated in the system. The monitor 314 can gather real time data, such as requests being sent to the server-side dispatcher 312, and resource status information, for example. The monitoring feature can include a visualization layer, which can present monitored data in the user interface 316. An administrator can use the monitoring user interface 316, for example, to troubleshoot customer parallelization issues. The monitoring user interface 316 can also be used during system development for testing and verification of features that have been added to the dispatcher 312 and/or the ARO wrapper 308. The monitoring user interface 316 can display resource availability and use information, and visualizations of resource use by concurrent tasks. Outputs displayed on the monitoring user interface 316 can be used to verify whether a dispatching algorithm is distributing resources correctly. Other features which may be included in the ARO wrapper 308 can include implementation of a switch, which can be used to enable/disable centralized orchestration (e.g., for legacy applications that have recently introduced integration with the ARO wrapper 308).

The server-side dispatcher 312 can be included in a set of dispatchers in the server-side layer 310. For instance, a separate dispatcher can be created for each application priority level. Each dispatcher can help dispatch and orchestrate an overall load, including pending requests in a queue 318 and incoming requests, among available application servers 320, based on application priority, available work processes and memory. Some application requests may result in data requests being sent to a database server 322. In some implementations, the database server 322 performs its own dispatching and load balancing algorithms.

Dispatchers enable parallelization and orchestrate and dispatch remote function calls based on server workload. The dispatchers manage the fixed resources that the particular customer has purchased. An application with a higher priority will generally get more resources (e.g., more work processes) than a concurrent application with a lower priority. Applications with a same priority may have resources allocated for that priority balanced between the applications of that priority. The dispatcher can consider all servers with a light or normal load and can remove from consideration, for a particular request, those servers that currently have a high load. If a system-wide maximum number of parallel tasks has been reached, or if all servers have a high load, a dispatcher can be configured to wait until a task or server becomes available.

The dispatcher decides whether a particular application will be executed at a particular time, whether an application will be paused, whether and which resources will be granted to a particular application, etc. Dispatching can be performed according to one of various dispatching algorithms. Dispatching algorithms can include, for example, suspend and resume, fixed sharing, and dynamic sharing, among others. The dispatcher objects can determine which processes run next, on which servers, based on the known server/resource information.

Figure 4:
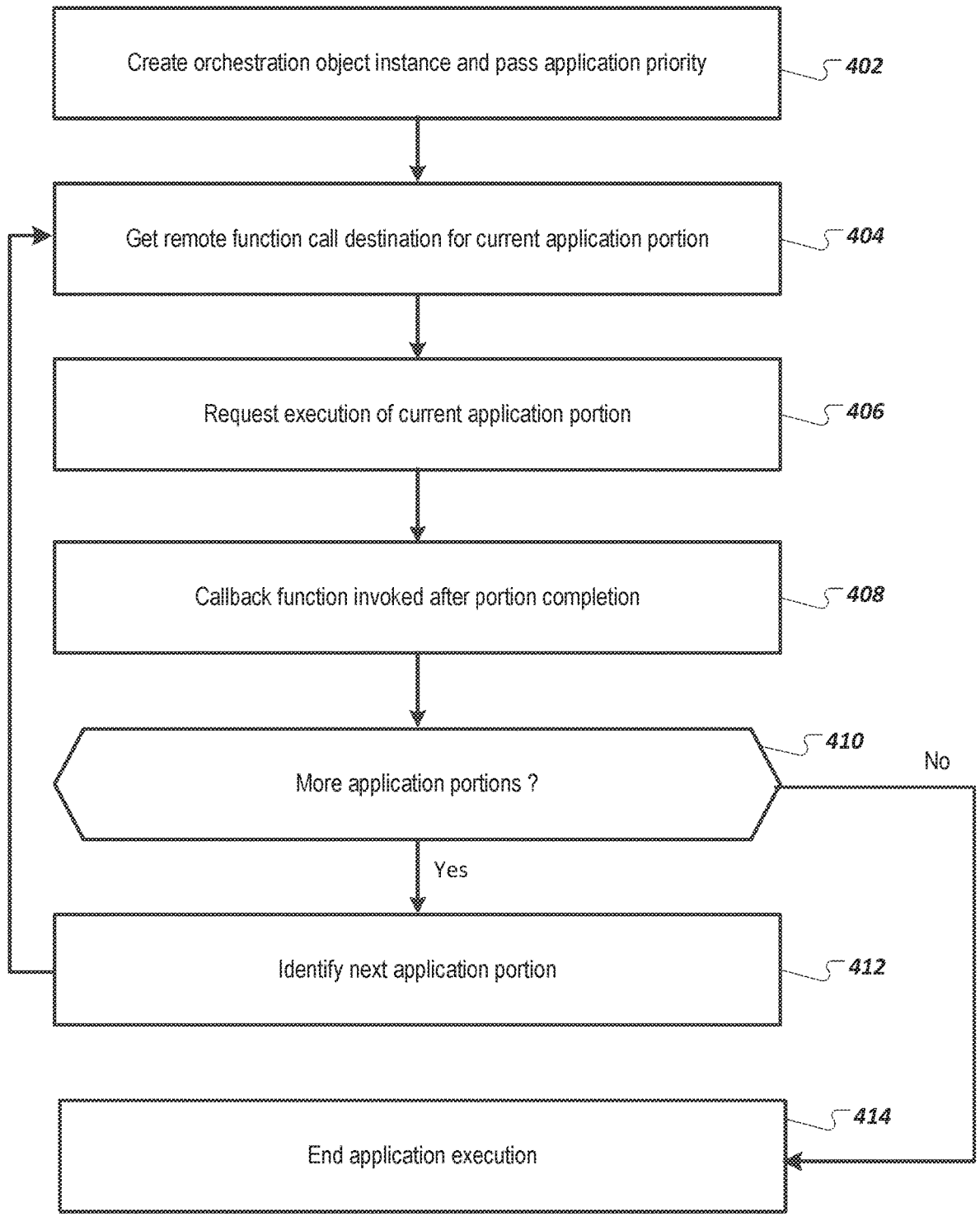
FIG. 4 illustrates an example flowchart of a process for applications that integrate with a centralized orchestration component.

FIG. 4 illustrates an example flowchart of a process 400 for applications that integrate with a centralized orchestration component. Applications that integrate with the centralized orchestration layer generally are applications that may request and use a significant amount of server resources. A systems provider can work with application developers to guide application developers how to best structure their applications to best integrate with the ARO layer.

Resource usage and balancing can be deferred to the orchestration layer, so applications generally should not (or no longer) include logic that calculates or checks available work processes, memory, processors, server groups, or other resources. If such logic is already in place, that logic can be wrapped with a switch check for a switch provided by the ARO wrapper.

Rather than the application having logic to check resources or perform complex thread/process structuring, applications configured to integrate with ARO can be structured to create small threads (e.g., small parallel sessions that are designed for short execution (e.g., up to a predetermined maximum processing time (e.g., ten seconds)) and/or up to a predetermined amount of memory usage (e.g., one hundred megabytes)). The application can be configured to send a request to the ARO layer for dispatching of these small sessions, without the application being concerned with whether there are currently enough resources, whether there are other applications running or pending, etc.

Applications can generally be structured to break up processing into multiple, small portions. For example, a complete set of work can be broken up into multiple portions, with each portion being performed in a respective iteration of a loop. For instance, a campaign application may want to send one million emails for an email campaign. The email sending task can be broken up into ten sub-tasks, with each sub-task configured to initiate sending of 100,000 emails, and each sub-task being executed when a particular iteration of the loop is performed. For instance, during a particular iteration, the application can invoke the dispatcher to request the execution of sending 100,000 emails. The application can provide a callback function that will be called when the processing for that iteration has been performed.

Application splitting into portions can enable improved load balancing. Once a particular task is dispatched, the system generally allows that task to complete, on the assigned processor, with the assigned work process. If a dispatched task is large, the system may have to wait a long time before being able to free up the work process assigned to the task. However, if applications split their work into a larger number of smaller tasks, when a particular small task is finished, dispatchers can determine whether to start a next small task for the application, or to pause the application (e.g., by not starting the next application portion), so as to assign resources (e.g., a work process) to another application that has a higher priority. The other application, if also broken up into small tasks, will notify the dispatching layer of completion of its small tasks, which can enable multiple load balancing/reassignment points, such as if yet another higher application sends execution requests.

With the approach of splitting application processing into multiple parallel tasks, the smaller the task size, the more flexibility and dispatching options are enabled for the dispatching layer to allow for intelligent dispatching based on current priorities in the system, since smaller tasks will finish sooner than larger tasks. In doing so, the processing can create opportunities for release of resources to higher priority applications. For instance, in the email campaign example mentioned above, a preferable approach may be to break up the email sending into one hundred portions of sending 1,000 emails, rather than ten portions of sending 100,000 emails.

As part of facilitating integration with the ARO layer, the systems provider can optionally provide an application template, for example, with outline steps that form a general structure that applications can use, e.g., as illustrated by the process 400.

At 402, the application creates an orchestration object instance and passes an application priority to the orchestration object instance. The orchestration object instance can be an instance of the ARO wrapper or an instance of a server-side dispatcher. If the orchestration object instance is a server-side dispatcher instance, requests below can be sent directly to the server-side dispatcher instance. If the orchestration object instance is an instance of the ARO wrapper, the ARO wrapper can create an instance of a server-side dispatcher object, and requests below can be sent by the application to the ARO wrapper with the ARO wrapper forwarding corresponding requests to the server-side dispatcher instance.

An orchestration object instance can be created for each particular application scenario having a particular application priority. As mentioned, the application priority is passed to the dispatcher object, with the priority being determined at runtime, retrieved from a settings table, or obtained in some other fashion. An application generally creates the orchestration object instance before performing asynchronous remote function calls. The application can use the orchestration object instance to request parallelization, as described below.

A dispatching algorithm can be configured when a dispatcher is instantiated. In some implementations, a default algorithm can be configured (e.g., suspend and resume), which can be used if an algorithm is not specified when the dispatcher is instantiated. If a customer wants a different algorithm than the default algorithm, another algorithm (e.g., dynamic sharing) can be specified when the dispatcher is instantiated. In some implementations, a type of dispatching algorithm to use is a system-wide setting that is retrieved and configured for the dispatcher when the dispatcher is instantiated.

At 404, the application receives a remote function call destination for a current application portion. For instance, the application can invoke a dispatch method on the orchestration object instance and the remote function call destination can be returned from the dispatch method. The application can be broken up into multiple portions, as described above. A first application portion can be identified as a first current portion for a first iteration. The remote function call destination can be a virtual server that is determined by a dispatcher. The dispatch method can be a request asking the server to tell the application which application server can be used for dispatching a next asynchronous RFC call (e.g., for a next application portion).

Dispatching is described in more detail below. Generally, however, the dispatcher selects a particular server from a server pool, and return server information about a server that can be used for the current application portion. If there are sufficient resources and if a maximal number of running parallel tasks has not been met, at the time of the dispatch method call, a destination can be returned to the application in a synchronous manner. As another example, if there are not sufficient resources, or if the maximal number of parallel tasks has been reached, the dispatch method may block itself (e.g., wait) until sufficient resources are available or other currently running tasks have completed. As another example, if a given dispatcher is of a lower priority than another active dispatcher instance, the dispatch method of the lower-priority dispatcher can block itself, e.g., wait to return a server destination, until there are no longer any dispatchers that have a higher priority. Accordingly, the set of dispatchers can performance balancing and throttling according to priority. The dispatch method can determine which application server has enough resources based on the workload balance settings chosen when the orchestration object instance was created. The dispatch method can return a RFC destination which can be used as destination for a subsequently invoked function module.

At 406, execution of the current application portion is requested. For instance, a function module can be invoked with the remote function call destination included as a destination parameter. As assigned server can execute the current application portion. A callback function can be provided by the application when the function module is invoked.

At 408, the callback function is invoked when the current application portion has been completed. Application developers can be directed to include code in the callback function to notify the dispatcher of the application portion completion. For instance, the dispatcher can include a "received_result( )" method, which can be called to indicate the application has received notification of a task completion, with corresponding result(s). Upon invocation of the received_result( ) method, the dispatcher can become aware of the availability of the work process that was used for the just completed task execution, so that the work process can be assigned to another pending task (e.g., based on current application priority status within the system).

At 410, a determination is made as to whether additional unprocessed application portion(s) exist. As mentioned, an application will generally be partitioned into multiple, smaller portions, so multiple loop iterations will be performed before all portions have been completed. If not all portions have been completed, a next application portion is identified, at 412, with processing returning to steps 404, 406, and 408 for the next application portion.

At 414, if all application portions have been processed, the application ends application execution. The application can close out of the orchestration object, to release the orchestration object (e.g., dispatcher). Notifying the dispatcher of final completion of an application of a particular priority can result in a server rebalancing resources, based on the priorities of the remaining pending applications. An end_dispatching method can be invoked on the dispatcher, for example, to notify the dispatcher that all remote function calls for the application have completed.

Figure 5:
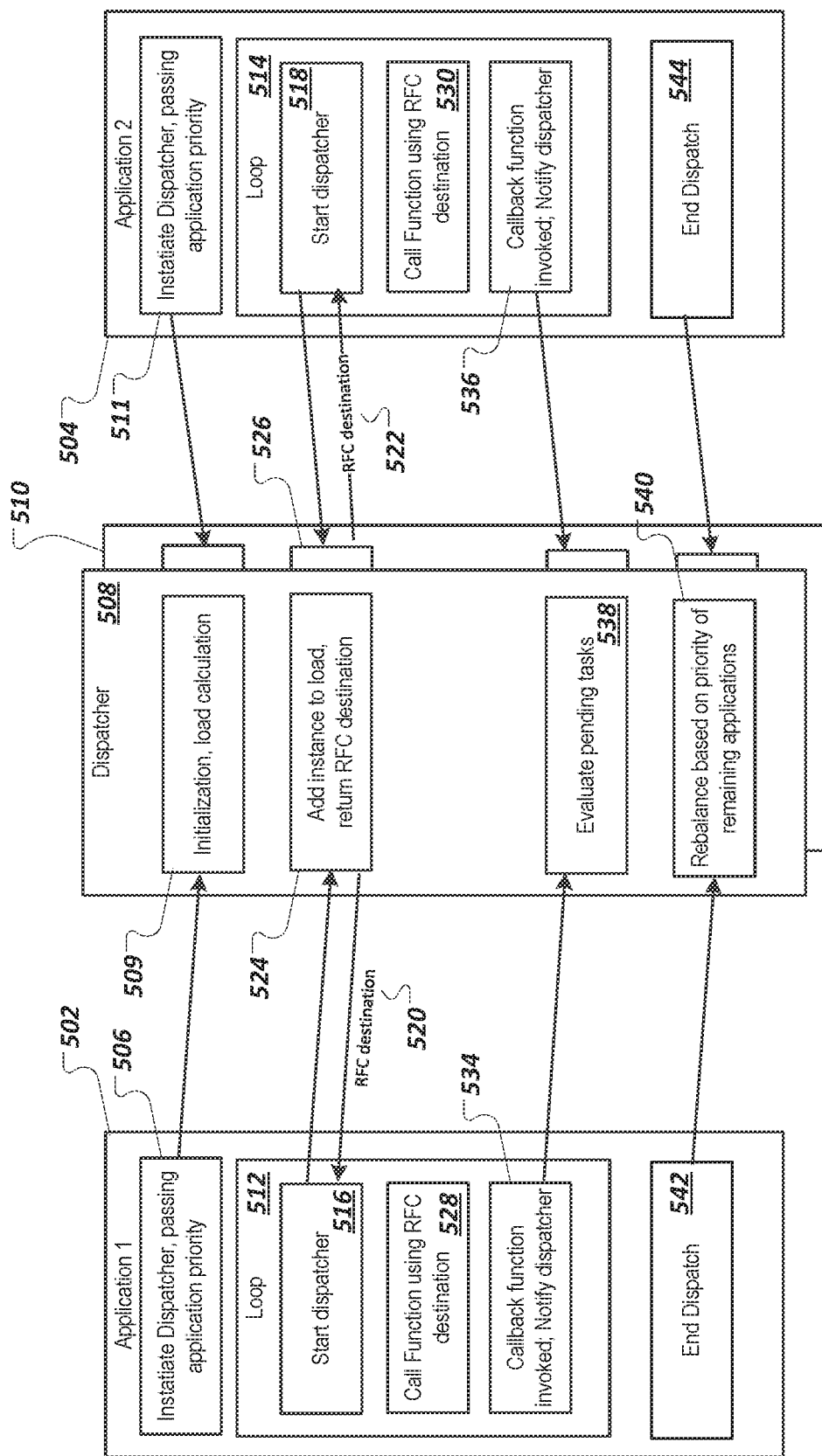
FIGS. 5-6 are block diagrams illustrating examples of systems for resource allocation and management.

FIG. 5 is a block diagram illustrating an example system 500 for resource allocation and management. Process 400 illustrates processing by a particular application, which may be occurring in parallel by multiple applications. For instance, the system 500 includes a first application 502 and a second application 504. Each application may be performing processing similar to that described in process 400, with processing by respective applications overlapping with processing done by other applications.

For instance, the first application 502 can, at 506, create a first dispatcher instance 508. In response to being created, the first dispatcher instance 508 can perform initialization, at 509, including load calculation, for example. The second application 504 can, at 510, create a second dispatcher instance 510, which can perform processing similar to step 509 (e.g., at 511), but for the second application 504. Each application 502 and 504 can perform similar tasks after creating a respective dispatcher instance.

For example, the applications 502 and 504 can initiate loops 512 and 514, respectively. Respective dispatch statements, at 516 and 518, can result in RFC destinations 520 and 522, respectively, being returned for execution of respective portions of the application 502 or 504 (e.g., respectively at 524 and a corresponding step 526 by the second dispatcher 504). As described above, execution of a dispatch statement by a respective dispatcher can include the dispatcher waiting until resources are available.

At 528 and 530 (e.g., at different times for respective iterations of each loop), the first application 502 and the second application call a remote function to request execution of a respective application portion, the request specifying either the RFC destination 520 or the RFC destination 522.

The applications 502 and 504 can have respective callback functions invoked (e.g., at 534 and 536, respectively), when remote calls are completed. A respective dispatcher can evaluate pending tasks (e.g., at 538), to determine how to allocate a released work process (e.g., the work process freed up due to a task completion may or may be assigned to a respective application for a next iteration of the loop 512 or the loop 514, such as if higher priority applications are pending). Additionally, other rebalancing may occur (e.g., at 540) when a respective application notifies a respective dispatcher of application completion (e.g., at 542 or 544).

Figure 6:
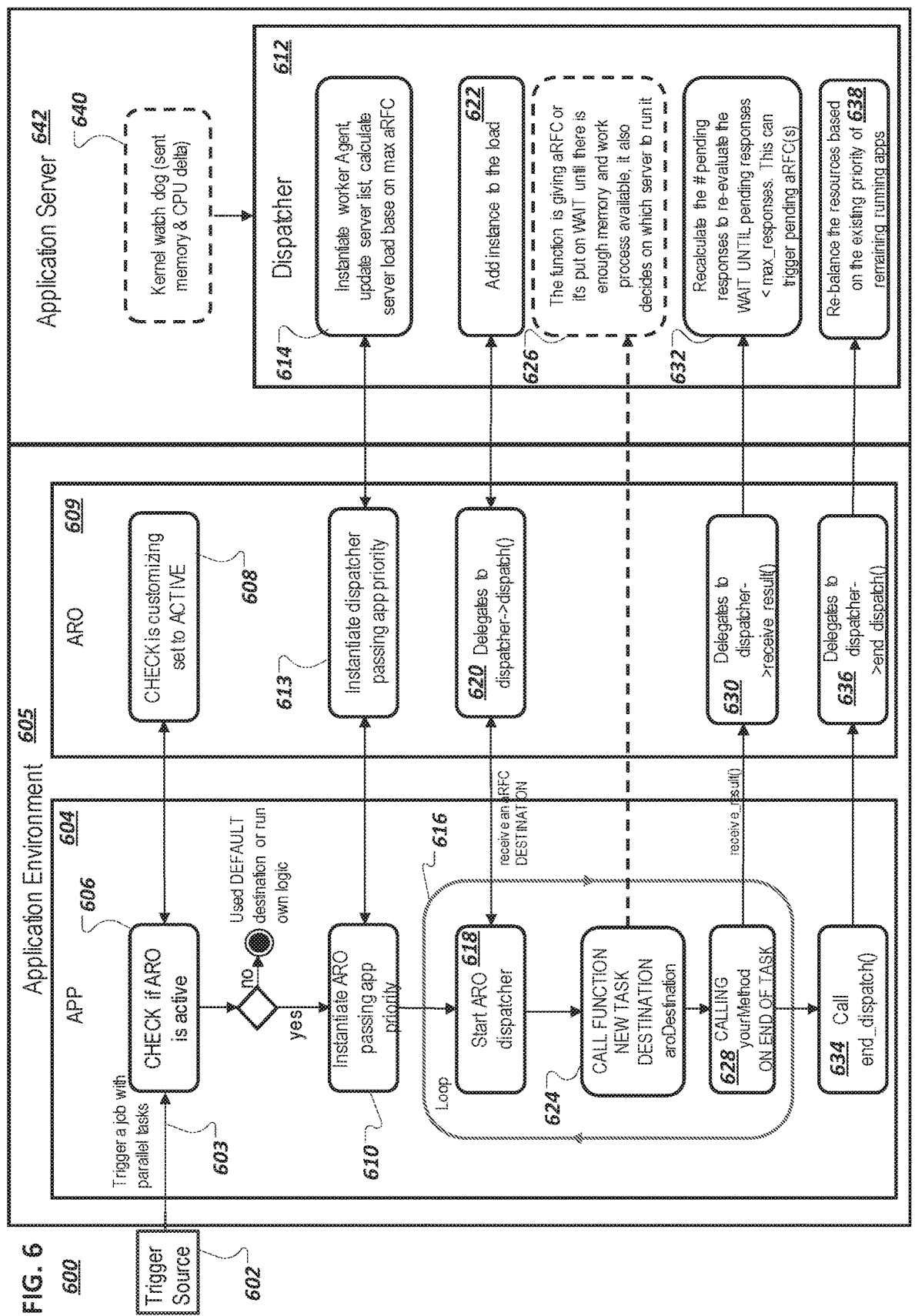

FIG. 6 is a block diagram illustrating an example system 600 for resource allocation and management. A trigger source 602 triggers (603) an application job that has parallel tasks. The trigger source 602 can be a user using a user interface or the trigger source 602 can be a detection of a scheduled job, such as a batch job. For instance, an email campaign execution or a product recommendation update can be scheduled batch jobs. The product recommendation update can be schedule to run periodically, for example.

The centralized orchestration component can have a switchable integration that can be turned off and on for applications. The switchable layer can be introduced for testing and support reasons and/or for customer specific enablement. The switch can be turned on or off as needed. In some implementations, the orchestration layer can be activated or deactivated per application, however, piecemeal enablement may not be preferred as selective enablement might not lead to most efficient orchestration of system resources among concurrent applications. The switch can be a systems provider switch, accessible by administrators, for example. As shown, an application 604 in an application environment 605 performs a determination 606 to determine whether the orchestration layer is active. The determination 606 can be performed by invoking a global ARO switch check 608, for example. If the orchestration layer is not active, the application 604 can proceed without ARO integration.

If the orchestration layer is active, the application can instantiate an ARO instance 609 (e.g., at 610) and pass an application priority to the ARO instance 609. The ARO instance 609 can, in turn, instantiate a dispatcher 612 (e.g., at 613), and forward the application priority to the dispatcher 612. During instantiation, the dispatcher 612 can instantiate a worker agent, update a server list, calculate a server load based on a maximum number of allowable RFCs, e.g., as illustrated by a note 614.

In some implementations, the application can include a per-application remote function call limit parameter along with the application priority. The RFC limit parameter can be a voluntary declaration that the application may not need all of the resources that may otherwise be granted to an application of the indicated application priority. The dispatcher 612 can receive the remote function call limit parameter from the ARO instance 609, and use the parameter during orchestration and balancing. The remote function call limit parameter can be expressed as a limit on remote function calls or as a percentage of a process allotment that the application would like the dispatcher to use. The supplied application priority, along with the remote function call limit parameter, can enable an application to fine tune a desired level of requested performance.

The application 604 can include a loop 616 which can essentially parallel the process 400 (and the loops 512 and 514). For instance, the application 604 can invoke a dispatch method, at 618, which can result in the ARO instance performing a delegation invocation (e.g., at 620) of a dispatch method on the dispatcher 612. As illustrated by a note 622, the dispatcher can add a load associated with the application portion for which the dispatch was invoked to an overall system load. As discussed above, the dispatcher can also return a RFC destination, which can be included on a CALL FUNCTION invocation 624 by the application 604.

As indicated by a note 626, as part of dispatching, the dispatcher 612 can select a server for the RFC, and return the RFC destination synchronously in response to the request, or delay the returning of the RFC destination (e.g., if higher priority applications need available resources). The RFC destination can be returned once there is enough memory and work processes available.

When the RFC has finished, a callback function provided by the application 604 is invoked at 628. The callback function can include a receive_result call to the ARO instance 609, which can, in turn, invoke a receive_result call 630 on the dispatcher 612. As indicated by a note 632, upon being notified that the RFC has finished, the dispatcher 612 can recalculate a number of pending application responses, and evaluate pending requests to determine whether another asynchronous function call can be invoked.

Once the loop 616 has finished, the application 604 can invoke an end_dispatch method (e.g., at 634) on the ARO instance, which can, in turn, invoke a corresponding end_dispatch method 636 on the dispatcher 612. Upon being notified that the application 604 has completed processing, the dispatcher 612 can rebalance resources based on the existing priority of remaining running applications (e.g., as indicated by a note 638).

Various dispatcher instances in the system can be aware of the other dispatcher instances. For instance, a system-wide table can include an entry for each registered dispatcher. Each entry can indicate a respective dispatcher priority. The end_dispatch method 636 for a particular dispatcher instance can include processing to inform the other dispatchers of the completion of work for the particular dispatcher instance, which can enable other dispatchers to adjust dispatching based on the current system load.

The dispatcher 612 can include a monitor 640 that can provide performance information for system servers, including an application server 642. The monitor 640 can provide kernel heartbeat information, regarding available resources and real-time status information for application servers. Dispatchers can use received kernel heartbeat information to determine how to dispatch application tasks.

Application priorities considered by the dispatcher 612 are separate from operating system kernel priorities. In some implementations, all remote function calls invoked as part of ARO integration are set to a same kernel level priority (e.g., low), in order to provide kernel priority uniformness. With kernel priority uniformness, application priority differences can take effect.

Figure 7:
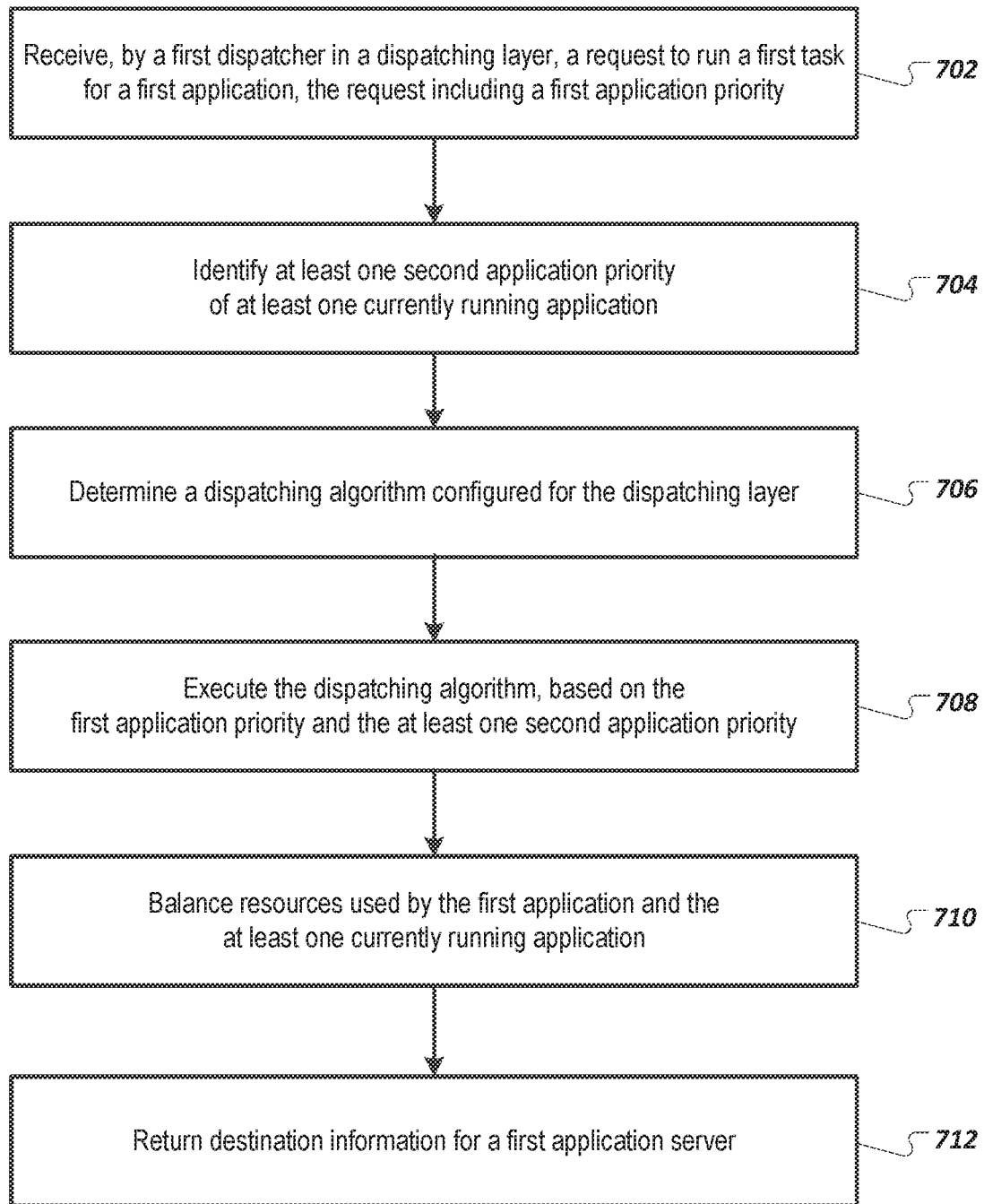
FIG. 7 is a flowchart of an example method for resource allocation and management based on application priority.

FIG. 7 is a flowchart of an example method 700 for resource allocation and management based on application priority. It will be understood that method 700 and related methods may be performed, for example, by any suitable system, environment, software, and hardware, or a combination of systems, environments, software, and hardware, as appropriate. For example, one or more of a client, a server, or other computing device can be used to execute method 700 and related methods and obtain any data from the memory of a client, the server, or the other computing device. In some implementations, the method 700 and related methods are executed by one or more previously described components. For example, the method 700 and related methods can be executed by the dispatcher 312 of FIG. 3. The method 700 can be executed, in parallel, by multiple dispatchers.

At 702, a request to run a first task for a first application is received, by a first dispatcher instance included in a dispatching layer. The request includes a first application priority. The first dispatcher instance is configured to assign a first application server among a set of application servers to the first task for execution of the first task. The first task can be a first application portion for the first application among multiple application portions that are configured to run in parallel.

At 704, at least one second application priority of at least one currently running application is identified. The at least one second application priority is different than the first application priority. The at least one second application priority can be a priority associated with a second dispatcher instance.

At 706, a dispatching algorithm configured for the dispatching layer is determined. The dispatching algorithm can be, for example, a suspend and resume algorithm where lower priority applications are suspended until higher priority applications are finished, a dynamic-sharing algorithm where resources are shared dynamically between running applications, or a fixed-sharing algorithm where resources are allocated to different applications based on weighted priorities of running applications. Other types of algorithms are possible.

At 708, the dispatching algorithm is executed, by the first dispatcher instance, to dispatch the first task to the first application server, based on the first application priority and the at least one second application priority.

At 710, dispatching the first task to the first application server can include balancing resources used by the first application and the at least one currently running application, according to the dispatching algorithm and based on the first application priority and the at least one second application priority, including assigning first resources to the first application.

At 712, destination information for the first application server is returned, in response to the request, for execution of the first task for the first application, at the first application server, using the first resources.

Figure 8:
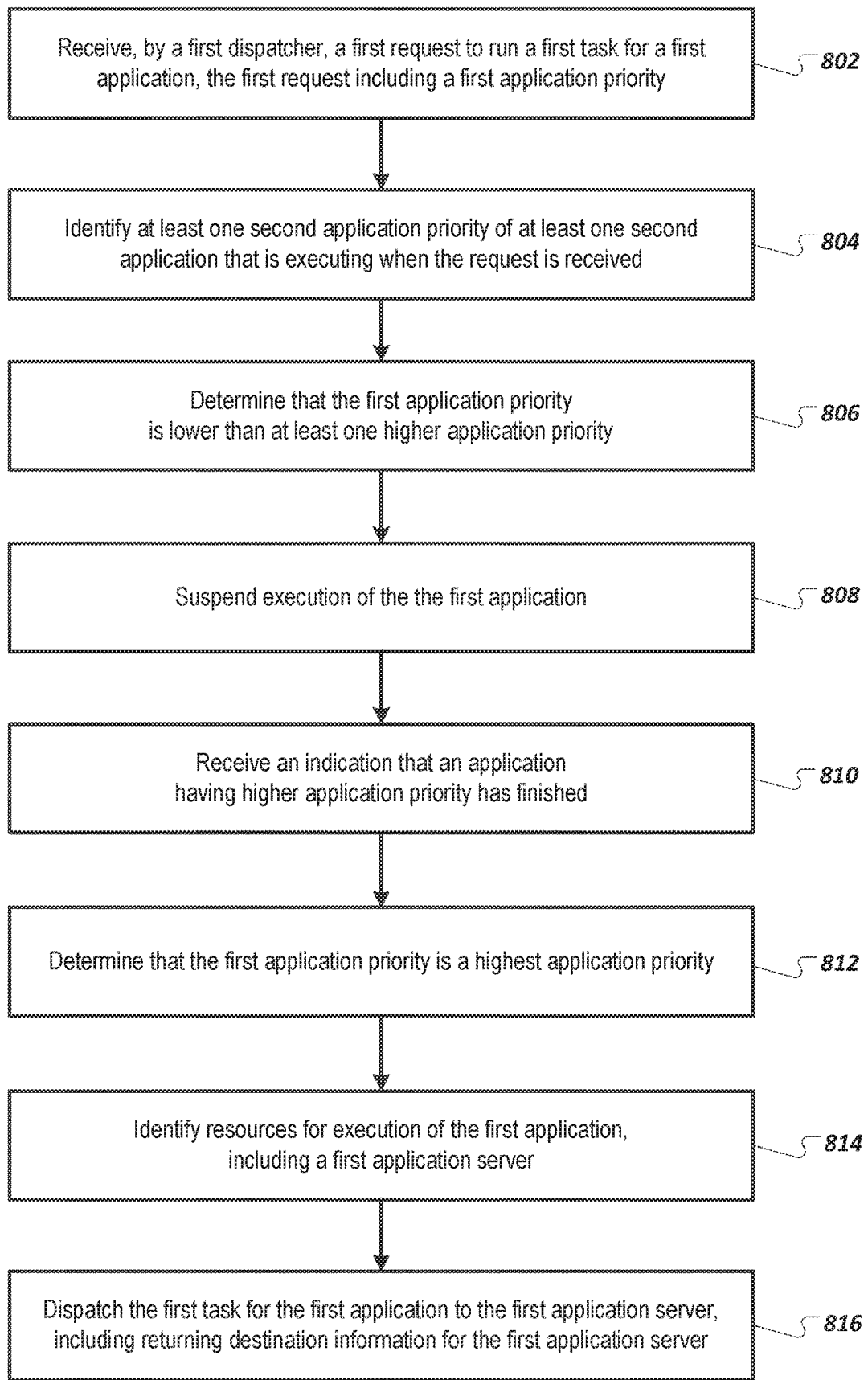
FIG. 8 is a flowchart of an example method for resource allocation and management using a suspend and resume strategy.

FIG. 8 is a flowchart of an example method 800 for resource allocation and management using a suspend and resume strategy. It will be understood that method 800 and related methods may be performed, for example, by any suitable system, environment, software, and hardware, or a combination of systems, environments, software, and hardware, as appropriate. For example, one or more of a client, a server, or other computing device can be used to execute method 800 and related methods and obtain any data from the memory of a client, the server, or the other computing device. In some implementations, the method 800 and related methods are executed by one or more previously described components. For example, the method 800 and related methods can be executed by the dispatcher 312 of FIG. 3. The method 800 can be run in parallel, by multiple dispatcher instances.

At 802, a first request is received, by a first dispatcher, in a dispatching layer, to run at least a first task for a first application. The first request includes a first application priority.

At 804, at least one second application priority of at least one second application that is executing when the request is received is identified.

At 806, a determination is made that the first application priority is lower than at least one higher application priority included in the at least one second application priority.

At 808, execution of the first application is suspended based on determining that the first application priority is lower than the at least one higher application priority. Suspending the first application can include waiting to respond to the first request until the first task is dispatched.

While the first application is suspended, a second application having a then highest application priority can be executed. While that second application is executing, a request to execute a third application with a still higher application priority can be received. Execution of the second application can be suspended, to enable execution of the third application. When the third application has completed, execution of the second application can resume.

At 810, an indication is received indicating that an application having a higher application priority has finished.

At 812, a determination is made that the first application priority is a highest application priority of currently-running applications.

At 814, resources for execution of the first application are identified, including selection of a first application server for the first application.

At 816, the first task for the first application is dispatched to the first application server, in response to the first request, including returning destination information for the first application server.

Figure 9:
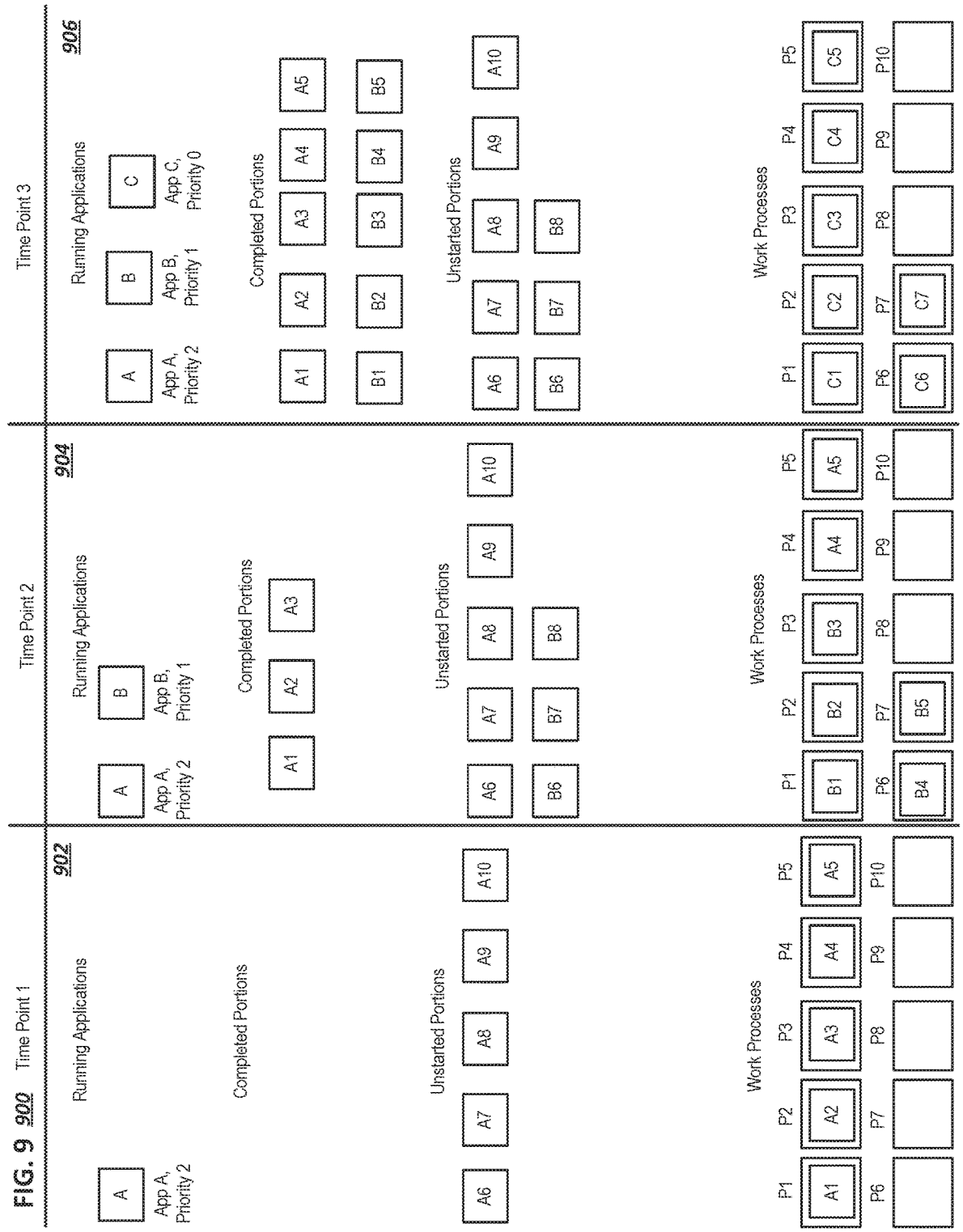
FIG. 9 is a block diagram illustrating an example system for resource allocation and management using a suspend and resume strategy.

FIG. 9 is a block diagram illustrating an example system 900 for resource allocation and management using a suspend and resume strategy. With a suspend and resume strategy, applications with lower priority are suspended until all applications with higher priority have finished. With the suspend and resume strategy, dispatchers running with a lower application priority can suspend themselves while there are other dispatcher objects running with higher application priorities. Accordingly, the suspend and resume strategy can enabling the suspension and resumption of sever resource allocation based on contextual and dynamic application priorities.

As an example, allocation of application tasks to ten example server work processes P1, P2, . . . , P10 is illustrated. For instance, in a first time period 902, an application A is an only running application. Application portions A1, A2, A3, A4, and A5 are shown as allocated to work processes P1, P2, P3, P4, and P5, respectively (e.g., the A1 portion is shown inside the P1 work process box, etc.). Work processes P6, P7, P8, P9, and P10 are currently unassigned. For instance, a server environment may set aside a certain number of work processes as a buffer to prevent system freeze. As another example, some of the unassigned work processes may have recently become available due to completion of other application task portions.

If no other applications come online, unstarted application portions A6, A7, A8, A9, and A10 may be assigned to some or all of the unassigned work processes P6, P7, P8, P9, and P10. However, before a next application portion A6 is assigned, an application B comes online. As shown in a second time point 904, the application A has been suspended due to the application B having a higher priority. Accordingly, none of the unstarted application portions A6, A7, A8, A9, and A10 will start until the portions for application B have finished. For instance, work processes P1, P2, and P3 have become available (e.g., with application portions A1, A2, and A3 now being shown as completed). Rather than assigning the work processes P1, P2, and P3 to application portions A6, A7, and A8, the work processes P1, P2, and P3 have been assigned to the first three portions of application B (e.g., B1, B2, and B3). Work processes P4 and P5 are still being used for execution of application portions A4 and A5. Work processes P6 and P7 have been assigned to application portions B4 and B4. Work processes P8, P9, and P10 remain unassigned (e.g., as a buffer, as described above, or due to being a just-completed work process).

At a third time point 906, an application C comes online, which has a higher application priority than application B (and application A). Application A remains suspended, and now application B is suspended as well. At the time point 906, application portions B1, B2, B3, B4, and B5 have been completed, but portions B6, B7, and B8 have been put on hold. Work processes P1, P2, P3, P4, P5, P6, and P7 are currently being used for application portions C1, C2, C3, C4, C5, C6, and C7, respectively. As application C portions finish, unstarted application B portions can begin. And when not all available work processes are needed for application B portions, the unstarted application A portions can be assigned (e.g., unless another higher priority application comes online).

Figure 10:
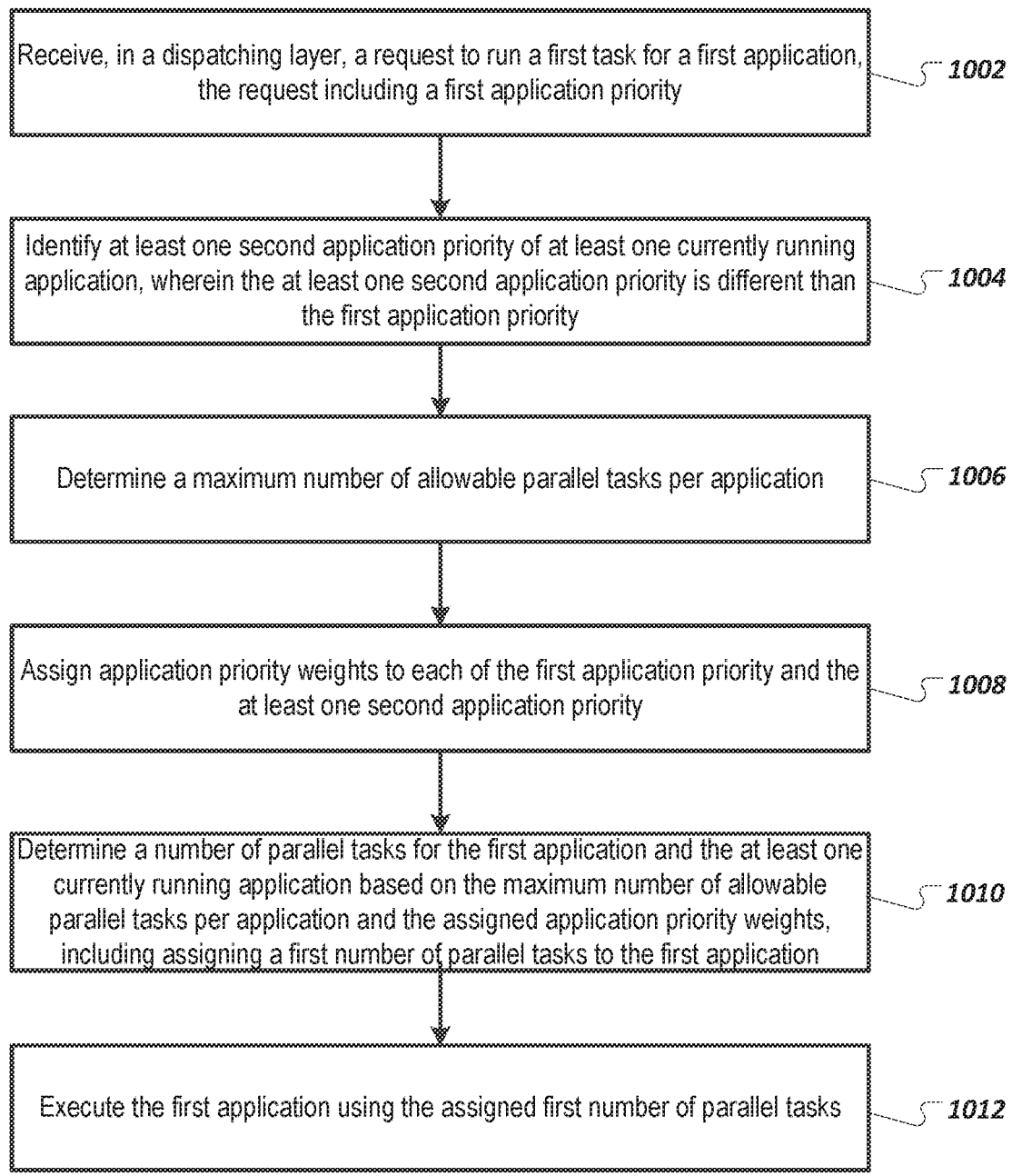
FIG. 10 is a flowchart of an example method for resource allocation and management using a fixed-sharing strategy.

FIG. 10 is a flowchart of an example method 1000 for resource allocation and management using a fixed-sharing strategy. It will be understood that method 1000 and related methods may be performed, for example, by any suitable system, environment, software, and hardware, or a combination of systems, environments, software, and hardware, as appropriate. For example, one or more of a client, a server, or other computing device can be used to execute method 1000 and related methods and obtain any data from the memory of a client, the server, or the other computing device. In some implementations, the method 1000 and related methods are executed by one or more previously described components. For example, the method 1000 and related methods can be executed by the dispatcher 312 of FIG. 3.

At 1002, a request to run a first task for a first application is received, in a dispatching layer. The request includes a first application priority.

At 1004, at least one second application priority of at least one currently running application is identified, wherein the at least one second application priority is different than the first application priority.

At 1006, a maximum number of allowable parallel tasks per application is determined.

At 1008, application priority weights are assigned to each of the first application priority and the at least one second application priority.

At 1010, a number of parallel tasks for the first application and the at least one currently running application are determined based on the maximum number of allowable parallel tasks per application and the assigned application priority weights, including the assigning of a first number of parallel tasks to the first application.

At 1012, the first application is executed using the assigned first number of parallel tasks.

Figure 11:
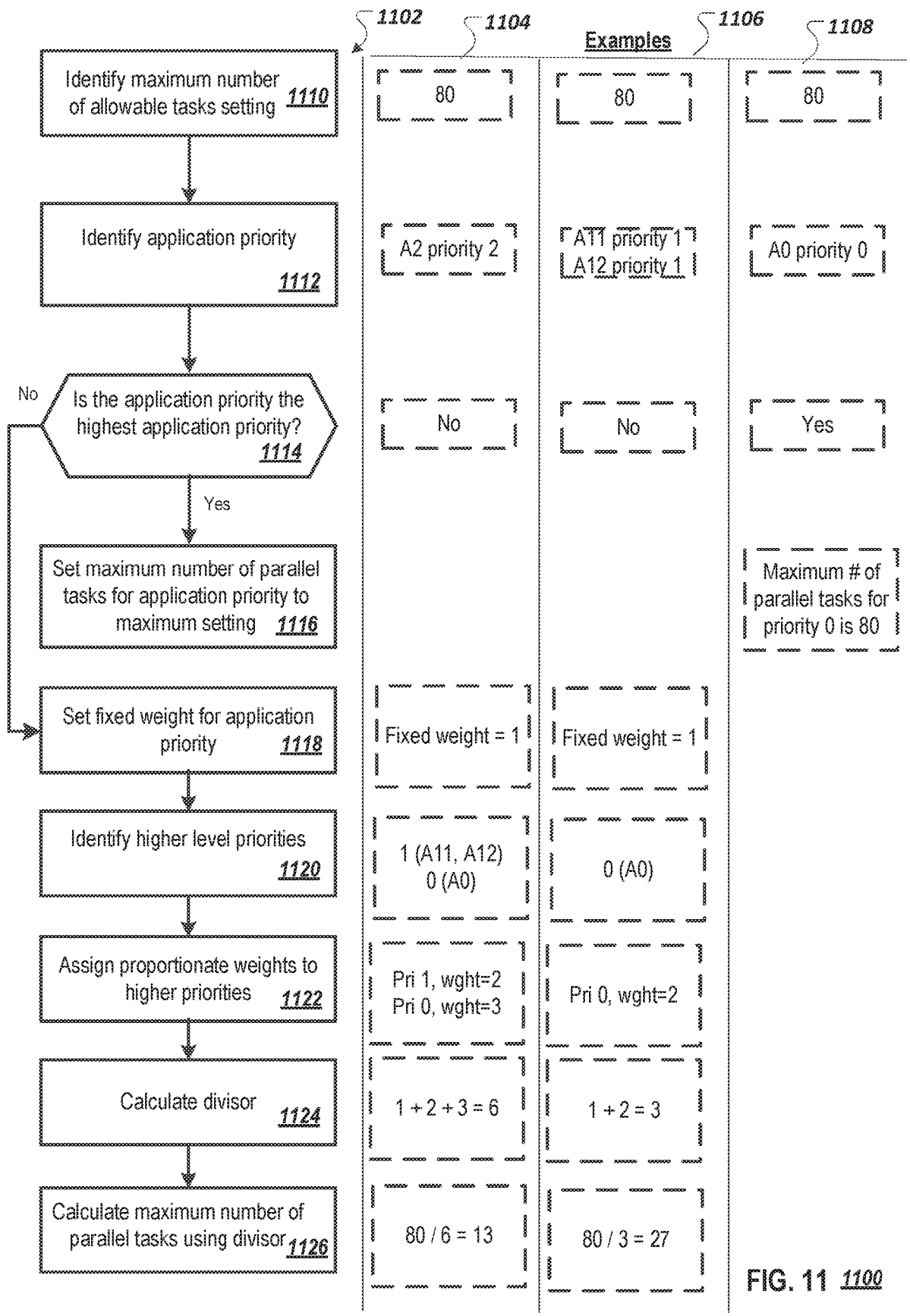
FIG. 11 is a block diagram illustrating an example system for resource allocation and management using a fixed-sharing strategy.

FIG. 11 is a block diagram illustrating an example system 1100 for resource allocation and management using a fixed-sharing strategy. With fixed-sharing, resources are allocated based on a weighted priority of the running applications. With a fixed-sharing strategy, if there is another dispatcher object with a higher application priority, a dispatcher object with a lower priority reduces it's maximal number of parallel tasks. This reduction can become greater if there are more higher application priorities active or if the difference of the application priorities is greater.

As a summary of steps, every dispatcher object goes through an active priority table that lists priorities of active applications, beginning with a next higher priority than the priority of the respective dispatcher. Starting with the next own priorities a weight factor is calculated by adding a fixed increment (e.g., one). The weight factors can be in a sequence, e.g., 1, 2, 3, etc. With this weight factor, a divisor is calculated. The divisor starts with 1. If an application priority is active its weight is added to the divisor. At the end, the maximal number of parallel tasks for an application priority is reduced by dividing it by the divisor.

As an illustration, a flowchart 1102 illustrates example steps for use in a fixed sharing algorithm. The example steps are described with reference to a first example 1104, a second example, 1106, and a third example 1108. That is, the fixed sharing algorithm can be performed for each of three example application priorities.

At 1110, a maximum number of tasks that can be used for an application priority in general is identified. For instance, an example of setting value of eighty maximum parallel tasks is identified (which is the same value for all three examples).

At 1112, an application priority is identified, for each application priority in use. For instance: in the first example 1104, an application priority of two is identified based on a running A2 application; in the second example 1106, an application priority of one is identified based on running A11 and A12 applications; and in the third example, an application priority of zero is identified based on a running A0 application.

At 1114, a determination is made, for each application priority in use, as to whether the application priority is the highest application priority. The application priority of zero for the third example 1108 is the highest application priority.

At 1116, for the highest application priority, the maximum number of parallel tasks for that priority is set to be equal to (or can remain at) the maximum number of tasks that can be used for an application priority in general. For instance, the maximum number of parallel tasks for the application priority of zero is set to 80, in the third example 1108.

At 1118, for application priorities that are not the highest priority, a fixed weight of one is assigned to the application priority.

At 1120, higher level priorities in use are identified. For instance, for the first example 1104, the higher priority of two for A22 and A22 applications, and the higher priority of zero for the A0 application are identified. For the second example 1106, the higher priority of zero for the A0 application is identified.

At 1122, proportionate weights are assigned to the identified higher priorities, with respective proportionate weights being proportionate to respective priority values of the higher priorities. A first proportionate weight of a next highest priority value can be a predefined factor (e.g., one, two) plus one, and subsequent still higher priority values can have proportionate weights that are each increased by an additional factor. For instance, in the first example 1106, the higher priority of one is assigned a first proportionate weight of 2 (e.g., as determined by adding one to a predefined factor of one). The higher priority of zero is assigned a higher proportionate weight value of three (e.g., as determined by adding a second factor of one to the previously determined proportionate weight value). For the second example 1106, the higher priority of zero is assigned a proportionate weight of two.

At 1124, a divisor is calculated for the application priority. The divisor can be calculated by adding together the proportionate weight values for the higher priorities to the fixed weight value for the priority. For instance, in the first example 1104, the divisor can be calculated as 1 (fixed weight)+2 (first proportionate weight)+3 (second proportionate weight)=6. In the second example 1106, the divisor can be calculated as 1 (fixed weight)+2 (proportionate weight)=3.

At 1126, a maximum number of parallel tasks for the application priority is calculated using the divisor determined for the priority. For instance, the number of parallel tasks for the application priority can be determined by dividing the maximum number of parallel tasks per application by the divisor. In the first example 1104, the maximum number of parallel tasks for application priority two can be calculated by dividing eighty by the divisor of six to come up with a value of thirteen (e.g., with rounding). In the second example 1106, the maximum number of parallel tasks for application priority one can be calculated by dividing eighty by the divisor of three to come up with a value of twenty seven.

Figure 12:
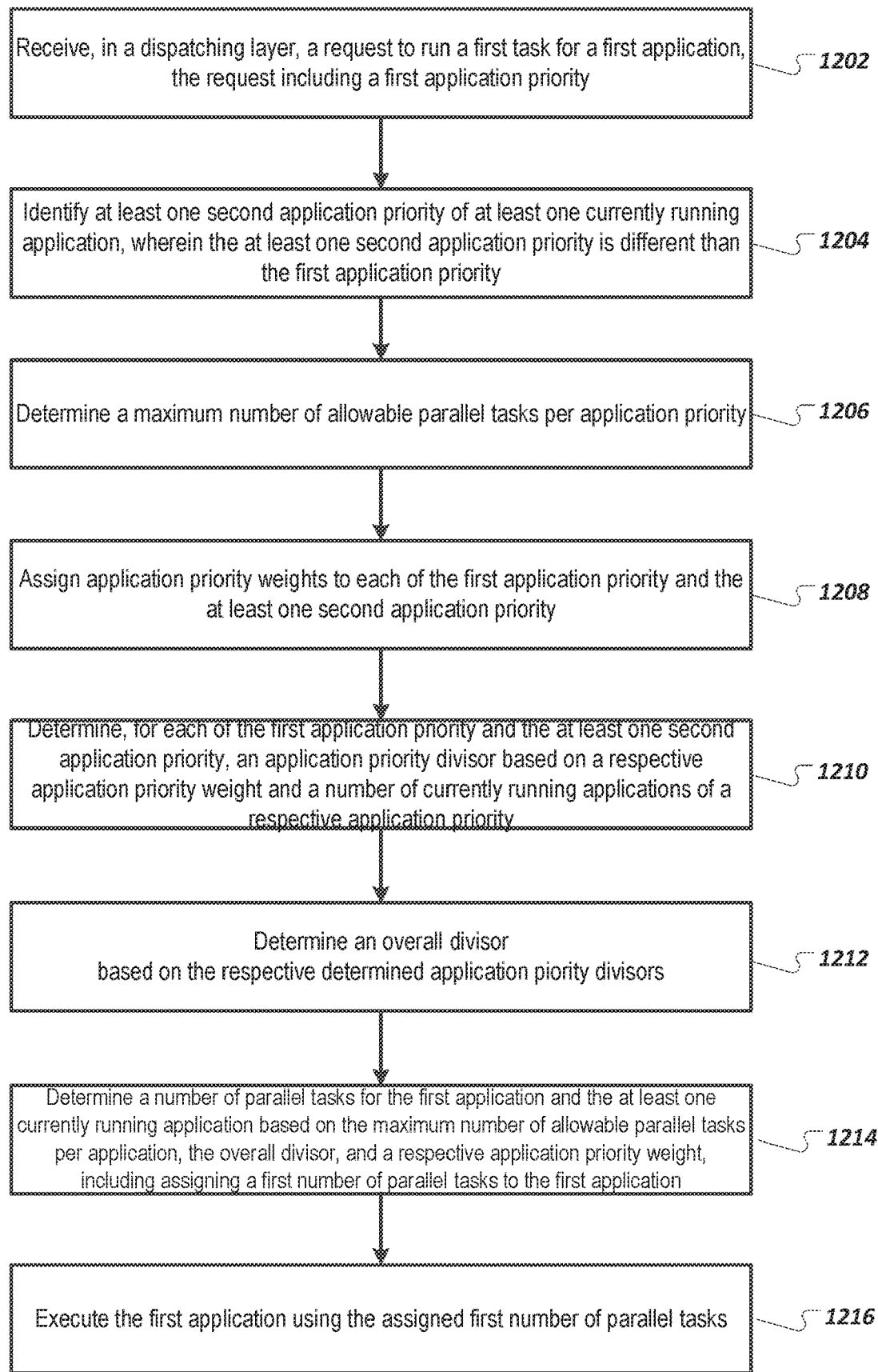
FIG. 12 is a flowchart of an example method for resource allocation and management using a dynamic-sharing strategy.

FIG. 12 is a flowchart of an example method 1200 for resource allocation and management using a dynamic-sharing strategy. It will be understood that method 1200 and related methods may be performed, for example, by any suitable system, environment, software, and hardware, or a combination of systems, environments, software, and hardware, as appropriate. For example, one or more of a client, a server, or other computing device can be used to execute method 1200 and related methods and obtain any data from the memory of a client, the server, or the other computing device. In some implementations, the method 1200 and related methods are executed by one or more previously described components. For example, the method 1200 and related methods can be executed by the dispatcher 312 of FIG. 3.

At 1202, a request to run a first task for a first application is received, in a dispatching layer. The request includes a first application priority.

At 1204, at least one second application priority of at least one currently running application is identified, wherein the at least one second application priority is different than the first application priority.

At 1206, a maximum number of allowable parallel tasks per application priority is determined.

At 1208, application priority weights are assigned to each of the first application priority and the at least one second application priority.

At 1210, for each of the first application priority and the at least one second application priority, an application priority divisor is determined based on a respective application priority weight and a number of currently running applications of a respective application priority.

At 1212, an overall divisor is determined based on the respective determined application priority divisors.

At 1214, a number of parallel tasks for the first application and the at least one currently running application are determined based on the maximum number of allowable parallel tasks per application, the overall divisor, and a respective application priority weight, including assigning a first number of parallel tasks to the first application.

At 1216, the first application is executed using the assigned first number of parallel tasks.

Figure 13:
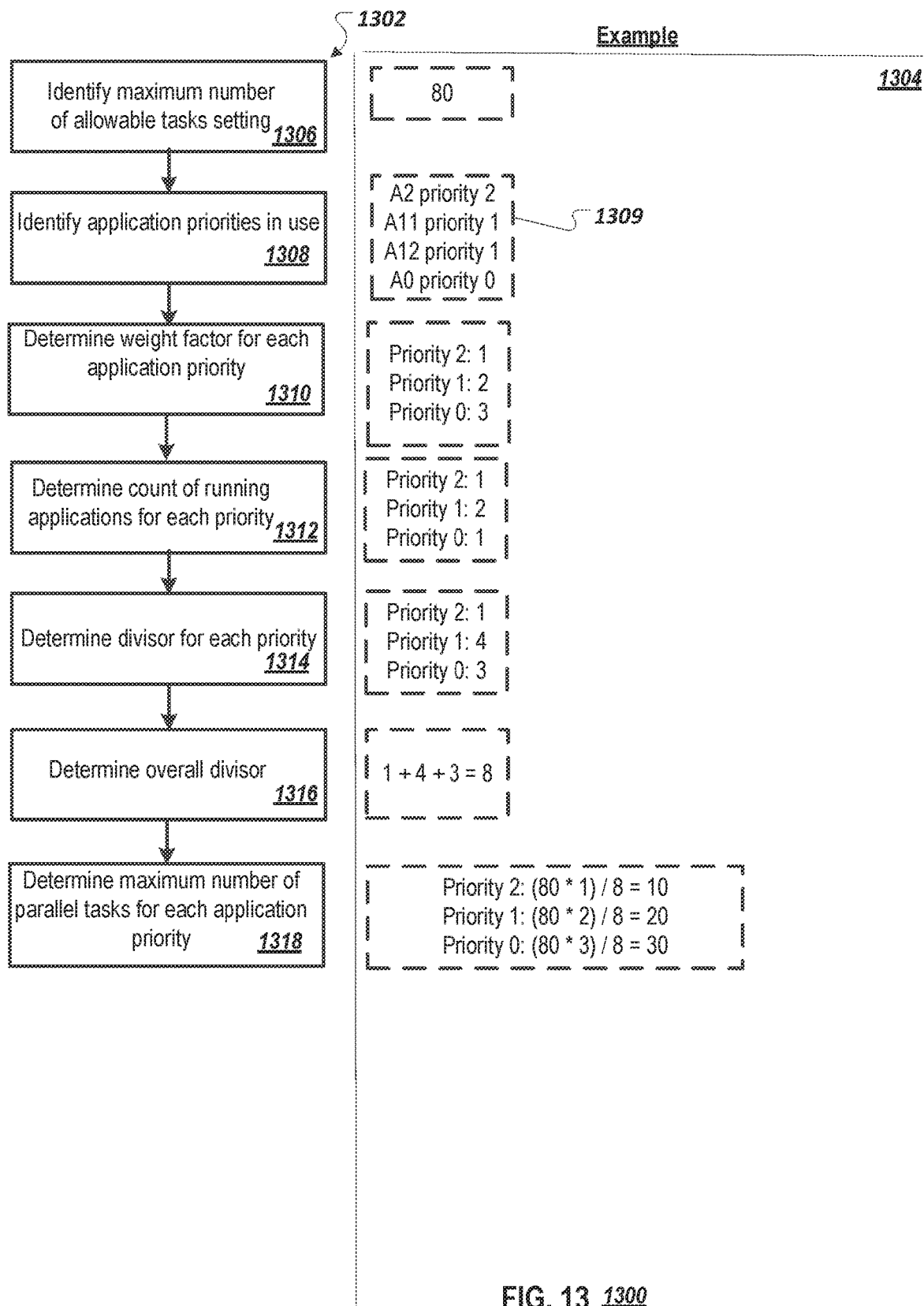
FIG. 13 is a block diagram illustrating an example system for resource allocation and management using a dynamic-sharing strategy.

FIG. 13 is a block diagram illustrating an example system 1300 for resource allocation and management using a dynamic-sharing strategy. With dynamic sharing, if another dispatch object is created all currently running dispatch objects are adjusted, even those with the highest priorities. The already running dispatcher objects can reduce their maximal number of parallel tasks to share resources with the new dispatcher object.

As a summary of steps, every dispatcher object goes through the active priority table beginning with the lowest active priority. A weight factor is calculated for each active priority starting with 1 and adding a fixed increment (e.g., one). The weights are multiplied by the number of running applications at that priority to get a divisor per application priority. A total divisor is calculated as a sum of these "application divisors". The new maximal number of tasks for a certain application priority can be calculated using a formula of (maximal number of tasks * weight of this priority)/total divisor.

As an illustration, a flowchart 1302 illustrates example steps for use in a dynamic sharing algorithm. The example steps are described with reference to an example 1304. The example 1304 uses the same example running applications as described for FIG. 11.

At 1306, a maximum number of tasks that can be used for an application priority in general is identified. For instance, an example of setting value of eighty maximum parallel tasks is identified.

At 1308, an application priority is identified, for each application priority in use. For instance, as shown in an example active priority table 1309, an application priority of two is identified based on a running A2 application, an application priority of one is identified based on running A11 and A12 applications and an application priority of zero is identified based on a running A0 application. For the active priority table 1309, each entry can be associated with a respective dispatcher.

At 1310, a weight factor is determined for each application priority. A weight factor of one can be assigned to a lowest application priority (e.g., the priority two). Weight factors for higher application priorities can be determined by adding continuing to add a predefined increment value to previously determined weight factors. For instance, if the increment is one, weight factors of two and three can be assigned to the application priorities one and zero, respectively.

At 1312, a count of running applications for each priority is determined. For instance, one each of application priorities two and zero can be counted, along with a count of two for application priority one.

At 1314, a divisor is determined for each application priority. For instance, a divisor for an application priority can be calculated as the weight factor for the priority multiplied by the count of running applications for the priority. For instance, since there are only one each of application two and zero priorities, divisors for priority two and zero are equal to the respective weight factors (e.g., one and three, respectively). Since there are two priority two applications, the divisor for priority two can be calculated as two (the count) multiplied by the weight factor of two for priority two, for a divisor of four.

At 1316, an overall divisor is determined. For instance, the overall divisor can be calculated as a sum of the respective divisors for the active application priorities. In the example 1304, the overall divisor can be calculated as 1+4+3=8.

At 1318, a maximum number of parallel tasks can be determined for each active application priority. For instance, a maximum number of parallel tasks for an application priority can be calculated using the formula (1);

$$\text{(max number of tasks setting)} * \text{weight of this priority} / \text{total divisor} \quad (1)$$

For instance, for priority two, the maximum number of parallel tasks can be calculated as: (80*1)/8=10. For priority one, the maximum number of parallel tasks can be calculated as: (80*2)/8=20. For priority zero, the maximum number of parallel tasks can be calculated as: (80*3)/8=30.

A problem can occur in a context of multiple servers with different power (e.g., CPUs, main memory, threads), if the distribution of resources to running processes is made only based on the count of available servers rather than the different servers' power (CPUs, memory, threads, etc.). For instance, with two similar tasks running in parallel, one may finish earlier than the other when it runs on a more powerful server, and inefficiencies can occur if this aspect is not taken into account when allocating/distributing resources to many different concurrent applications across a pool of servers with different hardware configurations.

To avoid these inefficiencies, a dispatcher can include server resource dispatching that takes into consideration the capacities of servers, to achieve efficient dispatching. If the capacities of the used servers are very different (number of CPUs, main memory, etc.), the tasks on one server may be completed much quicker than on another server. To achieve an optimal dispatching, not only should the number of work processes and application priority be used for dispatching, but server capacity as well, by tracking open tasks. Applications can support and provide task names/identifiers, including specifying task names/identifiers when calling dispatch and received_result methods, for example. Such notification can enable more tasks to be distributed on servers with a lower number of pending responses.

Using the unique task identifiers, a server dispatcher algorithm can track running processes across servers up to the end of their execution and can then re-allocate and re-distribute released resources in an improved fashion since the dispatcher knows what process on which server has ended. Running processes generally know when they have finished (e.g., by having a call-back function invoked), and the dispatcher can provide a function (e.g., received_result) to be called by an application, within the call-back function, in order to advise the dispatcher that the process does not need any more resources.

Being able to take advantage of the differences in server power among servers in a server pool can advantageous, as is an ability to be able to reallocate resources as soon as application is done with the resources. Particularly, applications notifying the dispatcher of completion avoids the dispatcher having to wait for an inactivity detection. The dispatcher providing a function to the running application to alert the server dispatcher that its process is done and no longer needs resources provides significant advantages in server resources optimization.

To perform the dispatching of tasks to the different application servers, the dispatcher object can maintain an internal "dispatch table." For every task which is capable of running in parallel, the dispatch table can include an entry that includes the following information: the unique task name, the name of the application server, and a status indicating whether there a task running on the server.

This table can be sorted in a way that normally the tasks are dispatched round robin to the different application servers. The dispatcher can keep an index to the line of this table used for the last task. When a new task should be started the dispatcher increments this index and searches for a line where currently no task is running. This line can be modified (the task name given by the application is set, active task is set TRUE) and the name of the application server is returned to the application.

When a task gets finished the dispatcher's method received_result method is called with the unique task name. Having this the dispatcher can actualize its internal dispatch table: clear the task name and set active task FALSE. As a result of this book keeping servers with higher performance can get more requests than servers with lesser performance.

Figure 14:
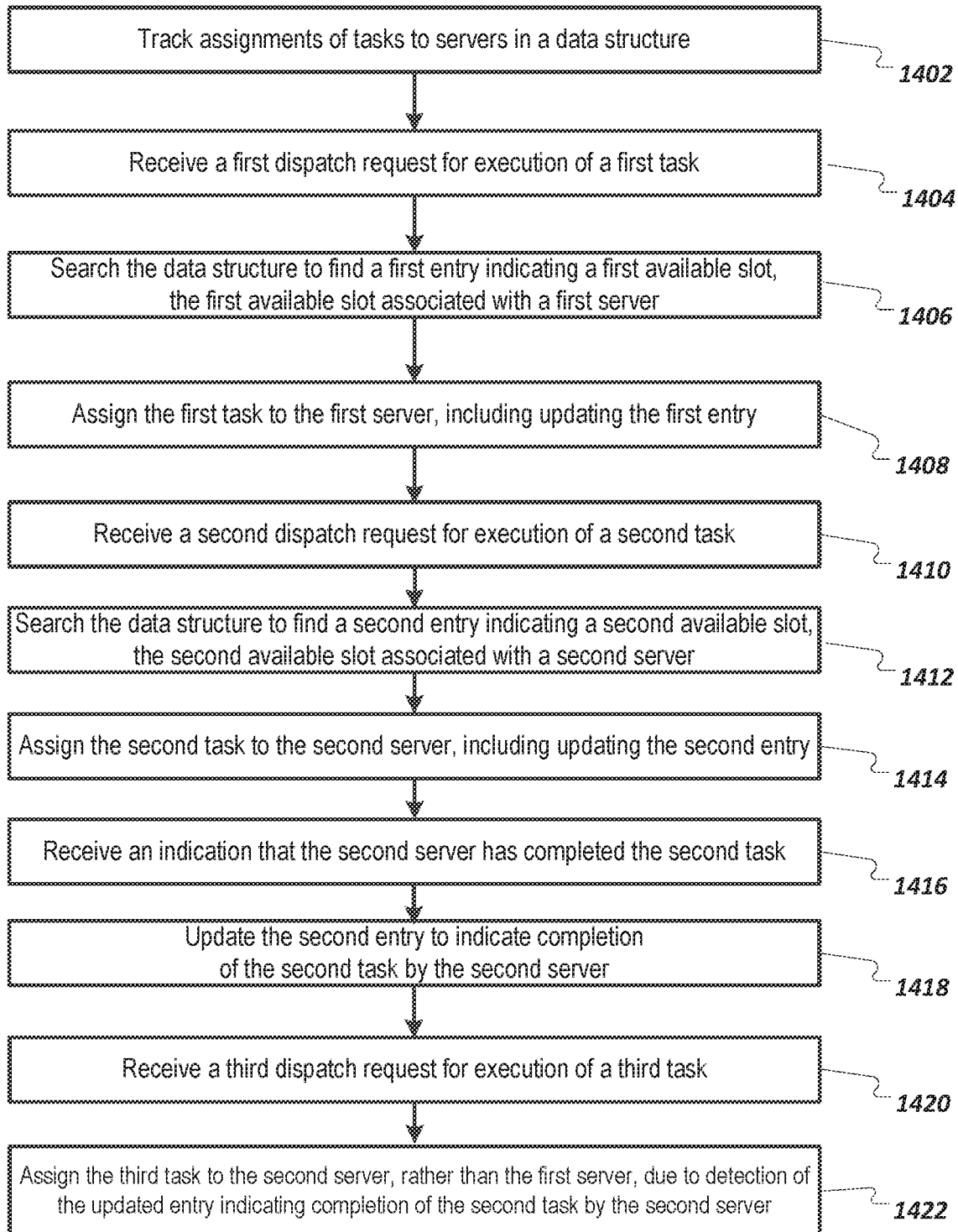
FIG. 14 is a flowchart of an example method for resource allocation and management based on server capacity.

FIG. 14 is a flowchart of an example method 1400 for resource allocation and management based on server capacity. It will be understood that method 1400 and related methods may be performed, for example, by any suitable system, environment, software, and hardware, or a combination of systems, environments, software, and hardware, as appropriate. For example, one or more of a client, a server, or other computing device can be used to execute method 1400 and related methods and obtain any data from the memory of a client, the server, or the other computing device. In some implementations, the method 1400 and related methods are executed by one or more previously described components. For example, the method 1400 and related methods can be executed by the dispatcher 312 of FIG. 3.

At 1402, assignments by a dispatcher of tasks to servers are tracked in a data structure. The data structure includes at least one entry for each server, with a number of entries per server being based on a capacity of the server, with servers with greater capacity having more entries than servers with lesser capacity, with an entry representing either an assignment of a task to a server or an available slot indicating an availability of a server to execute a task. As described below, tracking of assignment of tasks to servers in the data structure results in more tasks being assigned to the second, faster server than the first, slower server, due to faster task completion by the second server. For instance, in an example of FIG. 15, assignments of tasks to either a first server 1502 or a second server 1504 can be tracked in a data structure 1506 (e.g., where the second server 1504 is a more powerful server than the first server 1502).

For instance, the second server 1504 can run four tasks in parallel while the first server 1502 can run two tasks in parallel. Currently, the first server 1502 is executing "task 1" (e.g., as indicated in entry number one). The first server 1502 has capacity to run a second task (e.g., as indicated by an available indicator in entry number four). The second server 1504 is executing "task 2", "task 3", and "task 4", (e.g., as indicated in entries, two, three, and five). The second server has capacity to run a fourth task (e.g., as indicated by an available indicator in entry number six).

At 1404, a first dispatch request for execution of a first task is received. The first dispatch request can be received, from an application, by the dispatcher. The first task can have a unique identifier. For instance, with respect to FIG. 15, the first task can have an identifier of "task 5".

At 1406, the data structure is searched to find a first entry indicating a first available slot. The first available slot is associated with a first server. For instance, the data structure 1506 can be searched (e.g., starting at an entry corresponding to a maintained index), to locate entry number four.

At 1408, the first task is assigned to the first server. Assigning can include updating the first entry to track execution of the first task by the first server. For instance, as shown in an updated data structure 1508, entry number four has been updated to include the "task 5" identifier, to indicate that "task 5" has been assigned to the first server 1502.

At 1410, a second dispatch request is received, for execution of a second task. The second dispatch request can be received, from the application, by the dispatcher. The second task can have a unique identifier. For instance, with respect to FIG. 15, the second task can have an identifier of "task 6".

At 1412, the data structure is searched to find a second entry indicating a second available slot. The second available slot is associated with a second server that has a greater capacity than the first server. For instance, the updated data structure 1508 can be searched to locate entry number six, which represents an available slot for the faster second server 1504.

At 1414, the second task is assigned to the second server. Assigning the second task to the second server includes updating the second entry to track execution of the second task by the second server. For instance, as shown in a further-updated data structure 1510, entry number six has been updated to include the "task 6" identifier, to indicate that "task 6" has been assigned to the second server 1504.

At 1416, an indication that the second server has completed the second task is received, before the first task has completed. For instance a dispatcher method can be invoked by the application, to notify the dispatcher of the second task completion.

At 1418, the second entry is updated to indicate completion of the second task by the second server. For instance, the entry number six in the further-updated data structure 1510 can be updated, as illustrated in a still-further-updated data structure 1512. The updated entry number six indicates that the second server 1504 is again available to execute a task. Although other tasks in the still-further-updated data structure 1514 are shown as still running, different tasks can be completed at different times, and the dispatcher can receive, at various times, different indications of task completions. Accordingly, data structure entries can be updated, and the data structure can include one, none, or multiple available slots, at different times.

At 1420, a third dispatch request is received for execution of a third task.

At 1422, the third task is assigned to the second server, rather than the first server, due to detection of the updated second entry indicating completion of the second task by the second server. For instance, the dispatcher can locate the updated entry six in the still-further-updated data structure 1512, determine that the second server 1504 is available based on the available status in the entry, and assign the task to the second server 1504 based on the second server's determined availability. Accordingly, the dispatcher data structure can appear as shown in the further-updated data structure 1512 (e.g., indicating assignment of all slots). If another request is received while all slots are full, the dispatcher object can wait to receive an indication that a running task has completed, and can then assign a server and reply to the request with destination information for the assigned server.

Figure 16A:
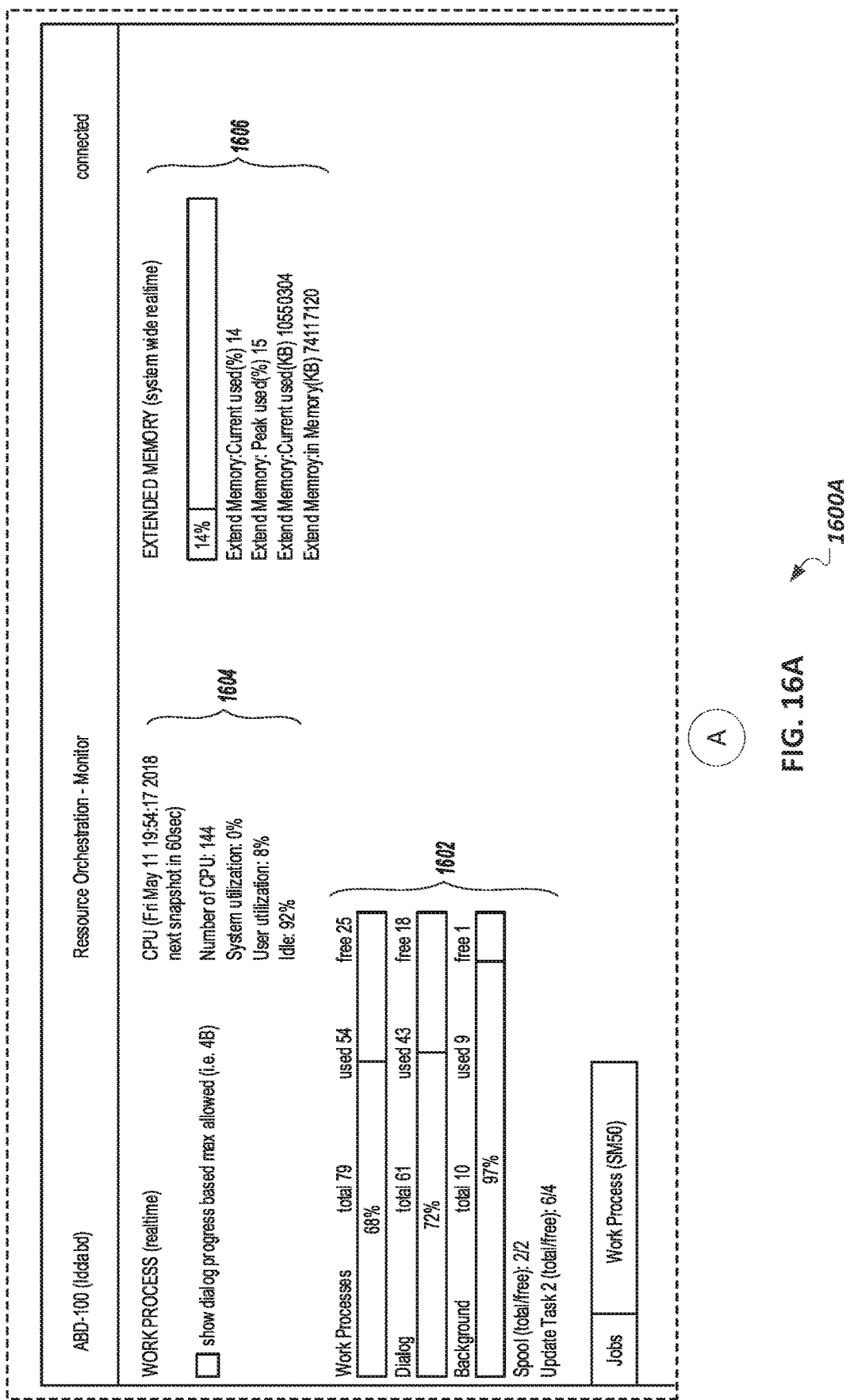

FIGS. 16A and 16B illustrate an example monitoring user interface 1600. As mentioned, the monitoring user interface 1600 can be used by administrators for troubleshooting customer application performance issues, during test of system upgrades, and for other purposes. As a summary, the monitoring user interface 1600 can be used to visualize which applications have been and are being dispatched, what and how many resources each application is consuming, and whether the amount and types of consumed resources match what the applications should be consuming according to a dispatching algorithm, which can be useful, for example, for customer troubleshooting and/or testing of the system.

Using the monitor, an administrator can watch, in real-time, using, e.g., data obtained by a web socket, information about an running application and its impact on the number of consumed and free work processes, CPUs and memory. An application's priority and its kernel priority can be examined. The monitor can present information about: a total number of work processes needed for an overall job, how many applications are running, how many applications are queued, how many applications are completed, a maximum number of remote functions calls a job was able to run in parallel, an overall time a job has taken to execute, and overall system(s) memory consumption.

As specific examples, a summary area 1602 includes information on total, free, and used work processes, dialog (e.g., foreground) and background processes. A CPU area 1604 displays a count, utilization, and idleness information for system processors. A memory area 1606 displays information about memory usage. A work processes area 1608 displays specific information for work process use, e.g., as a table with each row of the table displaying information for a particular work process. For instance, kernel priority 1610 and application priority 1612 can both be displayed. As discussed above, all applications managed by orchestration can have a same kernel priority, whereas different applications may have different application priorities. A process type 1614 and user identifier 1616 are displayed. A memory area 1618 displays memory usage information for specific work processes. Job identifiers 1619 indicate which jobs are being executed by respective work processes. RFC statistics 1620 indicate a number of running, pending, and maximum remote calls for each work process. A time spent area 1622 can indicate processing time for a work process.

Figure 17:
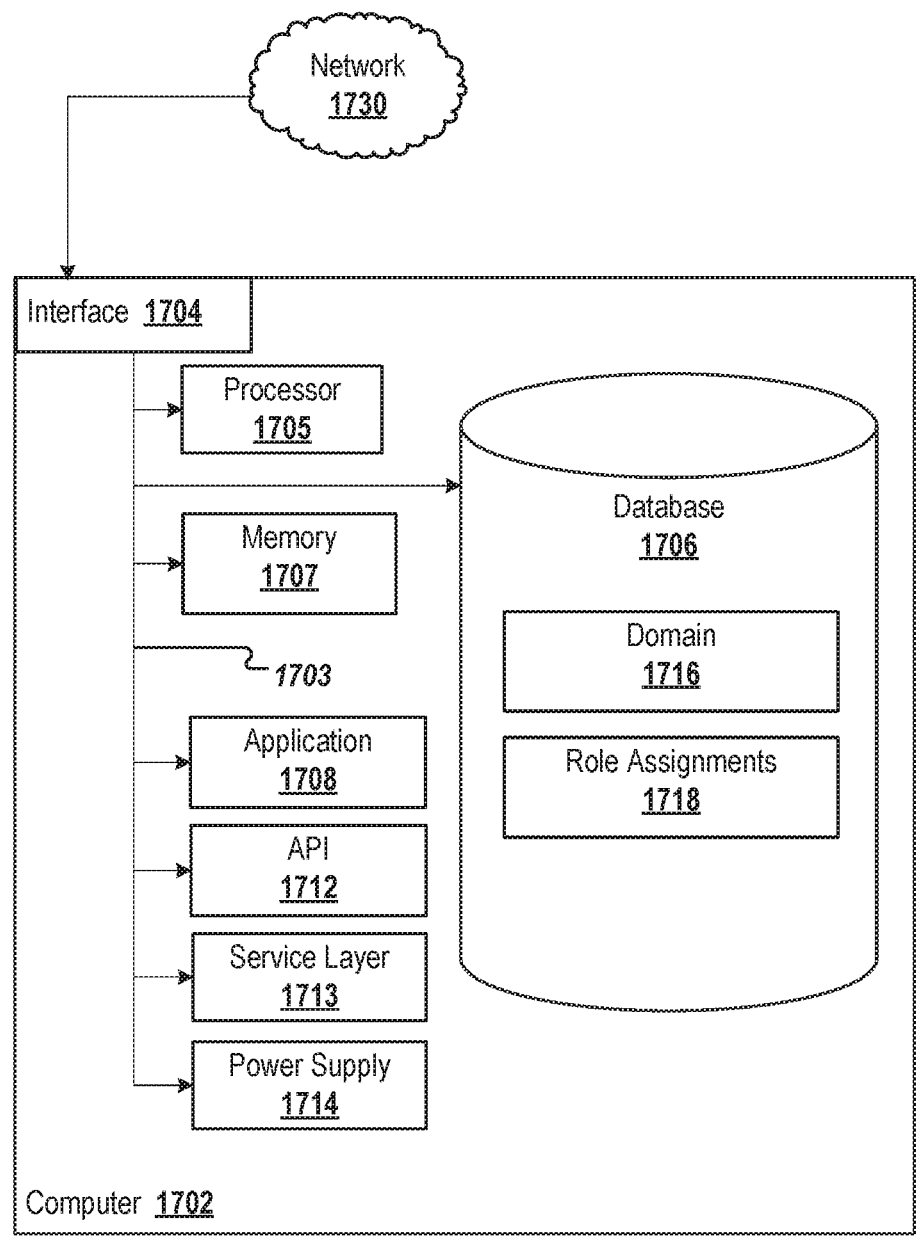
FIG. 17 is a block diagram illustrating an example of a computer-implemented system used to provide computational functionalities associated with described algorithms, methods, functions, processes, flows, and procedures, according to an implementation of the present disclosure.

FIG. 17 is a block diagram illustrating an example of a computer-implemented System 1700 used to provide computational functionalities associated with described algorithms, methods, functions, processes, flows, and procedures, according to an implementation of the present disclosure. In the illustrated implementation, System 1700 includes a computer 1702 and a network 1730.

The illustrated computer 1702 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the computer 1702 can include an input device, such as a keypad, keyboard, or touch screen, or a combination of input devices that can accept user information, and an output device that conveys information associated with the operation of the computer 1702, including digital data, visual, audio, another type of information, or a combination of types of information, on a graphical-type user interface (UI) (or GUI) or other UI.

The computer 1702 can serve in a role in a distributed computing system as, for example, a client, network component, a server, or a database or another persistency, or a combination of roles for performing the subject matter described in the present disclosure. The illustrated computer 1702 is communicably coupled with a network 1730. In some implementations, one or more components of the computer 1702 can be configured to operate within an environment, or a combination of environments, including cloud-computing, local, or global.

At a high level, the computer 1702 is an electronic computing device operable to receive, transmit, process, store, or manage data and information associated with the described subject matter. According to some implementations, the computer 1702 can also include or be communicably coupled with a server, such as an application server, e-mail server, web server, caching server, or streaming data server, or a combination of servers.

The computer 1702 can receive requests over network 1730 (for example, from a client software application executing on another computer 1702) and respond to the received requests by processing the received requests using a software application or a combination of software applications. In addition, requests can also be sent to the computer 1702 from internal users (for example, from a command console or by another internal access method), external or third-parties, or other entities, individuals, systems, or computers.

Each of the components of the computer 1702 can communicate using a system bus 1703. In some implementations, any or all of the components of the computer 1702, including hardware, software, or a combination of hardware and software, can interface over the system bus 1703 using an application programming interface (API) 1712, a service layer 1713, or a combination of the API 1712 and service layer 1713. The API 1712 can include specifications for routines, data structures, and object classes. The API 1712 can be either computer-language independent or dependent and refer to a complete interface, a single function, or even a set of APIs. The service layer 1713 provides software services to the computer 1702 or other components (whether illustrated or not) that are communicably coupled to the computer 1702. The functionality of the computer 1702 can be accessible for all service consumers using the service layer 1713. Software services, such as those provided by the service layer 1713, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the computer 1702, alternative implementations can illustrate the API 1712 or the service layer 1713 as stand-alone components in relation to other components of the computer 1702 or other components (whether illustrated or not) that are communicably coupled to the computer 1702. Moreover, any or all parts of the API 1712 or the service layer 1713 can be implemented as a child or a sub-module of another software module, enterprise application, or hardware module without departing from the scope of the present disclosure.

The computer 1702 includes an interface 1704. Although illustrated as a single interface 1704, two or more interfaces 1704 can be used according to particular needs, desires, or particular implementations of the computer 1702. The interface 1704 is used by the computer 1702 for communicating with another computing system (whether illustrated or not) that is communicatively linked to the network 1730 in a distributed environment. Generally, the interface 1704 is operable to communicate with the network 1730 and includes logic encoded in software, hardware, or a combination of software and hardware. More specifically, the interface 1704 can include software supporting one or more communication protocols associated with communications such that the network 1730 or hardware of interface 1704 is operable to communicate physical signals within and outside of the illustrated computer 1702.

The computer 1702 includes a processor 1705. Although illustrated as a single processor 1705, two or more processors 1705 can be used according to particular needs, desires, or particular implementations of the computer 1702. Generally, the processor 1705 executes instructions and manipulates data to perform the operations of the computer 1702 and any algorithms, methods, functions, processes, flows, and procedures as described in the present disclosure.

The computer 1702 also includes a database 1706 that can hold data for the computer 1702, another component communicatively linked to the network 1730 (whether illustrated or not), or a combination of the computer 1702 and another component. For example, database 1706 can be an in-memory or conventional database storing data consistent with the present disclosure. In some implementations, database 1706 can be a combination of two or more different database types (for example, a hybrid in-memory and conventional database) according to particular needs, desires, or particular implementations of the computer 1702 and the described functionality. Although illustrated as a single database 1706, two or more databases of similar or differing types can be used according to particular needs, desires, or particular implementations of the computer 1702 and the described functionality. While database 1706 is illustrated as an integral component of the computer 1702, in alternative implementations, database 1706 can be external to the computer 1702.

The computer 1702 also includes a memory 1707 that can hold data for the computer 1702, another component or components communicatively linked to the network 1730 (whether illustrated or not), or a combination of the computer 1702 and another component. Memory 1707 can store any data consistent with the present disclosure. In some implementations, memory 1707 can be a combination of two or more different types of memory (for example, a combination of semiconductor and magnetic storage) according to particular needs, desires, or particular implementations of the computer 1702 and the described functionality. Although illustrated as a single memory 1707, two or more Memories 1707 or similar or differing types can be used according to particular needs, desires, or particular implementations of the computer 1702 and the described functionality. While memory 1707 is illustrated as an integral component of the computer 1702, in alternative implementations, memory 1707 can be external to the computer 1702.

The application 1708 is an algorithmic software engine providing functionality according to particular needs, desires, or particular implementations of the computer 1702, particularly with respect to functionality described in the present disclosure. For example, application 1708 can serve as one or more components, modules, or applications. Further, although illustrated as a single application 1708, the application 1708 can be implemented as multiple applications 1708 on the computer 1702. In addition, although illustrated as integral to the computer 1702, in alternative implementations, the application 1708 can be external to the computer 1702.

The computer 1702 can also include a power supply 1714. The power supply 1714 can include a rechargeable or non-rechargeable battery that can be configured to be either user- or non-user-replaceable. In some implementations, the power supply 1714 can include power-conversion or management circuits (including recharging, standby, or another power management functionality). In some implementations, the power supply 1714 can include a power plug to allow the computer 1702 to be plugged into a wall socket or another power source to, for example, power the computer 1702 or recharge a rechargeable battery.

There can be any number of computers 1702 associated with, or external to, a computer system containing computer 1702, each computer 1702 communicating over network 1730. Further, the term "client," "user," or other appropriate terminology can be used interchangeably, as appropriate, without departing from the scope of the present disclosure. Moreover, the present disclosure contemplates that many users can use one computer 1702, or that one user can use multiple computers 1702.

The preceding figures and accompanying description illustrate example processes and computer-implementable techniques. But illustrated systems (or their software or other components) contemplate using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   receiving, in a dispatching layer, a request to run a first task for a first application, the request including a first application priority;
   identifying at least one second application priority of at least one currently running application, wherein the at least one second application priority is different than the first application priority;
   determining a maximum number of allowable parallel tasks per application priority;
   assigning application priority weights to each of the first application priority and the at least one second application priority, wherein a first application priority weight is assigned to the first application priority for the first application and at least one second application priority weight is assigned to the at least one second application priority for the at least one currently running application;
   after assigning the application priority weights, determining a first application priority divisor for the first application priority and a second application priority divisor for the at least one second application priority, wherein the first application priority divisor is determined by multiplying the first application priority weight by a first number of currently running applications of the first application priority, and the second application priority divisor for the at least one second application priority is determined by multiplying the at least one second application priority weight by a second number of currently running applications of the at least one second application priority;
   after determining the first application priority divisor and the second application priority divisor, determining an overall divisor based on the first application priority divisor and the second application priority divisor;
   after determining the overall divisor, determining a number of parallel tasks for the first application and the at least one currently running application based on the maximum number of allowable parallel tasks per application priority, the overall divisor, and a respective application priority weight, wherein determining includes assigning a first number of parallel tasks to the first application; and
   executing the first application using the assigned first number of parallel tasks.

2. The method of claim 1, wherein an application priority weight for a higher priority application is a larger weight than an application priority weight for a lower priority application.

3. The method of claim 1, wherein application priority weights are determined by determining accumulating in a respective application priority weight at least one fixed increment.

4. The method of claim 3, wherein the number of fixed increments to accumulate in a given application priority weight is proportionate to the priority rank of the application priority.

5. The method of claim 1, wherein determining the number of parallel tasks for the first application comprises:
   calculating an intermediate value by multiplying the maximum number of allowable tasks per application priority by the application priority weight for the first application priority; and
   dividing the intermediate value by the overall divisor.

6. The method of claim 1, wherein the first application priority is not a highest priority application and a number of parallel tasks for a highest priority application is reduced based on the assigning of the first number of parallel tasks to the first application.

7. The method of claim 1, wherein the method further comprises:
   after assigning the application priority weights, determining the first number of currently running applications of the first application priority and the second number of currently running applications of the at least one second application priority, wherein the at least one second application priority weight is based on the first application priority weight, wherein a second number of parallel tasks for the at least one currently running application are reduced to share resources with the first number of parallel tasks for the first application, and wherein determining the overall divisor comprises:
   determining the overall divisor by summing the first application priority divisor and the second application priority divisor.

8. A system comprising:
   one or more computers; and
   a non-transitory computer-readable medium coupled to the one or more computers having instructions stored thereon which, when executed by the one or more computers, cause the one or more computers to perform operations comprising:
   receiving, in a dispatching layer, a request to run a first task for a first application, the request including a first application priority;
   identifying at least one second application priority of at least one currently running application, wherein the at least one second application priority is different than the first application priority;
   determining a maximum number of allowable parallel tasks per application priority;
   assigning application priority weights to each of the first application priority and the at least one second application priority, wherein a first application priority weight is assigned to the first application priority for the first application and at least one second application priority weight is assigned to the at least one second application priority for the at least one currently running application;
   after assigning the application priority weights, determining a first application priority divisor for the first application priority and a second application priority divisor for the at least one second application priority, wherein the first application priority divisor is determined by multiplying the first application priority weight by a first number of currently running applications of the first application priority, and the second application priority divisor for the at least one second application priority is determined by multiplying the at least one second application priority weight by a second number of currently running applications of the at least one second application priority;

after determining the first application priority divisor and the second application priority divisor, determining an overall divisor based on the first application priority divisor and the second application priority divisor;

after determining the overall divisor, determining a number of parallel tasks for the first application and the at least one currently running application based on the maximum number of allowable parallel tasks per application priority, the overall divisor, and a respective application priority weight, wherein determining includes assigning a first number of parallel tasks to the first application; and executing the first application using the assigned first number of parallel tasks.

9. The system of claim 8, wherein an application priority weight for a higher priority application is a larger weight than an application priority weight for a lower priority application.

10. The system of claim 8, wherein application priority weights are determined by determining accumulating in a respective application priority weight at least one fixed increment.

11. The system of claim 10, wherein the number of fixed increments to accumulate in a given application priority weight is proportionate to the priority rank of the application priority.

12. The system of claim 8, wherein determining the number of parallel tasks for the first application comprises:
calculating an intermediate value by multiplying the maximum number of allowable tasks per application priority by the application priority weight for the first application; and
dividing the intermediate value by the overall divisor.

13. The system of claim 8, wherein the first application priority is not a highest priority application and a number of parallel tasks for a highest priority application is reduced based on the assigning of the first number of parallel tasks to the first application.

14. The system of claim 8, wherein the instructions further cause the one or more computers to perform operations comprising:
after assigning the application priority weights, determining the first number of currently running applications of the first application priority and the second number of currently running applications of the at least one second application priority, wherein the at least one second application priority weight is based on the first application priority weight, wherein a second number of parallel tasks for the at least one currently running application are reduced to share resources with the first number of parallel tasks for the first application, and wherein determining the overall divisor comprises:
determining the overall divisor by summing the first application priority divisor and the second application priority divisor.

15. A computer program product encoded on a non-transitory storage medium, the product comprising non-transitory, computer readable instructions for causing one or more processors to perform operations comprising:
receiving, in a dispatching layer, a request to run a first task for a first application, the request including a first application priority;
identifying at least one second application priority of at least one currently running application, wherein the at least one second application priority is different than the first application priority;
determining a maximum number of allowable parallel tasks per application priority;
assigning application priority weights to each of the first application priority and the at least one second application priority, wherein a first application priority weight is assigned to the first application priority for the first application and at least one second application priority weight is assigned to the at least one second application priority for the at least one currently running application;
after assigning the application priority weights, determining a first application priority divisor for the first application priority and a second application priority divisor for the at least one second application priority, wherein the first application priority divisor is determined by multiplying the first application priority weight by a first number of currently running applications of the first application priority, and the second application priority divisor for the at least one second application priority is determined by multiplying the at least one second application priority weight by a second number of currently running applications of the at least one second application priority;
after determining the first application priority divisor and the second application priority divisor, determining an overall divisor based on the first application priority divisor and the second application priority divisor;
after determining the overall divisor, determining a number of parallel tasks for the first application and the at least one currently running application based on the maximum number of allowable parallel tasks per application priority, the overall divisor, and a respective application priority weight, wherein determining includes assigning a first number of parallel tasks to the first application; and
executing the first application using the assigned first number of parallel tasks.

16. The computer program product of claim 15, wherein an application priority weight for a higher priority application is a larger weight than an application priority weight for a lower priority application.

17. The computer program product of claim 15, wherein application priority weights are determined by determining accumulating in a respective application priority weight at least one fixed increment.

18. The computer program product of claim 17, wherein the number of fixed increments to accumulate in a given application priority weight is proportionate to the priority rank of the application priority.

19. The computer program product of claim 15, wherein determining the number of parallel tasks for the first application comprises:
calculating an intermediate value by multiplying the maximum number of allowable tasks per application priority by the application priority weight for the first application; and
dividing the intermediate value by the overall divisor.

20. The computer program product of claim 19, wherein the first application priority is not a highest priority application and a number of parallel tasks for a highest priority application is reduced based on the assigning of the first number of parallel tasks to the first application.

* * * * *